United States Patent
Iwanaga et al.

(10) Patent No.: US 11,214,644 B2
(45) Date of Patent: Jan. 4, 2022

(54) RUBBERY POLYMER, GRAFT COPOLYMER, AND THERMOPLASTIC RESIN COMPOSITION

(71) Applicant: UMG ABS, LTD., Tokyo (JP)

(72) Inventors: Takashi Iwanaga, Ube (JP); Yoshitaka Naito, Ube (JP)

(73) Assignee: TECHNO-UMG CO., LTD., Tokyo (JP)

(*) Notice: Subject to any disclaimer, the term of this patent is extended or adjusted under 35 U.S.C. 154(b) by 110 days.

(21) Appl. No.: 16/071,341

(22) PCT Filed: Jan. 18, 2017

(86) PCT No.: PCT/JP2017/001529
§ 371 (c)(1),
(2) Date: Jul. 19, 2018

(87) PCT Pub. No.: WO2017/126545
PCT Pub. Date: Jul. 27, 2017

(65) Prior Publication Data
US 2020/0165370 A1    May 28, 2020

(30) Foreign Application Priority Data

| Jan. 21, 2016 | (JP) | JP2016-009798 |
| Mar. 25, 2016 | (JP) | JP2016-062085 |
| Mar. 25, 2016 | (JP) | JP2016-062086 |

(51) Int. Cl.
| C08F 265/06 | (2006.01) |
| C08F 2/22 | (2006.01) |
| C08F 220/18 | (2006.01) |
| C08F 220/08 | (2006.01) |
| C08F 212/08 | (2006.01) |
| C08L 51/04 | (2006.01) |

(52) U.S. Cl.
CPC ............ C08F 265/06 (2013.01); C08F 2/22 (2013.01); C08F 212/08 (2013.01); C08F 220/18 (2013.01); *C08L 51/04* (2013.01)

(58) Field of Classification Search
CPC .......... C08L 25/14; C08L 33/14; C08L 51/04; C08F 265/06; C08F 2/22; C08F 212/08; C08F 220/18
See application file for complete search history.

(56) References Cited

U.S. PATENT DOCUMENTS

| 9,328,186 B2 | 5/2016 | Tomita et al. |
| 2004/0152821 A1 | 8/2004 | Saegusa et al. |
| 2009/0178773 A1 | 7/2009 | Brockmeyer et al. |
| 2010/0081764 A1 | 4/2010 | Ouzineb et al. |
| 2015/0329715 A1* | 11/2015 | Zilles ............... C08L 25/14 252/500 |
| 2018/0312693 A1 | 11/2018 | Iwanaga et al. |

FOREIGN PATENT DOCUMENTS

| EP | 3369755 A1 | 9/2018 |
| JP | S55-038860 A | 3/1980 |
| JP | S59-051906 A | 3/1984 |
| JP | S60-179402 A | 9/1985 |
| JP | H09-296011 A | 11/1997 |
| JP | 2000-355616 A * | 12/2000 |
| JP | 2009-541505 A | 11/2009 |
| JP | 2010-505987 A | 2/2010 |
| JP | 2011-122016 A | 6/2011 |
| JP | 2012-136590 A | 7/2012 |
| JP | 2012-214734 A | 11/2012 |
| JP | 2015-019750 A | 2/2015 |
| JP | 5805066 B2 | 11/2015 |
| WO | 2014/096222 A2 | 6/2014 |

OTHER PUBLICATIONS

PCT/ISA/210, "International Search Report for International Application No. PCT/JP2017/001529," dated Mar. 21, 2017.
Europe Patent Office, "Search Report for European Patent Application No. 17741422.4," dated Aug. 2, 2019.
Japan Patent Office, "Office Action for Japanese Patent Application No. 2017-562844," dated Jan. 19, 2021.

* cited by examiner

*Primary Examiner* — Robert D Harlan
(74) *Attorney, Agent, or Firm* — Manabu Kanesaka

(57) ABSTRACT

A graft copolymer has good moldability and good continuous moldability, and a thermoplastic resin molded article having excellent impact resistance can be produced. A method can produce the graft copolymer. A graft copolymer (B-I) produced by grafting at least one vinyl monomer (b-I) selected from the group consisting of an aromatic vinyl, an alkyl (meth)acrylate, and a vinyl cyanide to a rubbery polymer mixture including a rubbery polymer (A-I) and a hydrophobic substance, the rubbery polymer (A-I) including an alkyl (meth)acrylate unit and a multifunctional monomer unit copolymerizable with the alkyl (meth)acrylate, the hydrophobic substance having a kinematic viscosity of 5 mm$^2$/s or more at 40° C. or a kinematic viscosity of 2 to 4 mm$^2$/s at 100° C., a principal constituent of the hydrophobic substance being a hydrocarbon. A thermoplastic resin composition includes the graft copolymer (B-I). A molded article produced uses the thermoplastic resin composition.

13 Claims, 1 Drawing Sheet

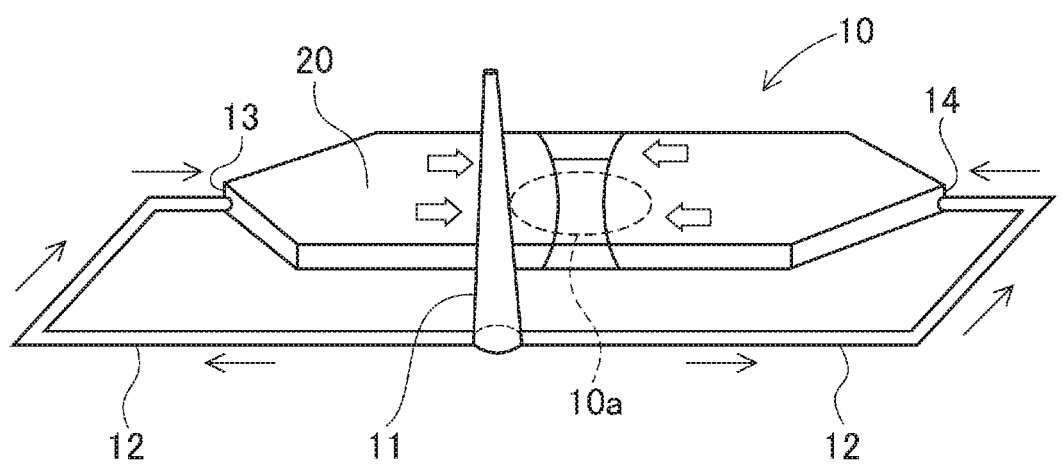

RUBBERY POLYMER, GRAFT COPOLYMER, AND THERMOPLASTIC RESIN COMPOSITION

TECHNICAL FIELD

The present invention relates to the first to third inventions below.

The first invention relates to a graft copolymer which has good moldability and good continuous moldability and with which a molded article having excellent impact resistance can be produced and a method for producing the graft copolymer. The first invention also relates to a method for producing a rubbery polymer with which the above graft copolymer can be produced, a thermoplastic resin composition including the graft copolymer, and a molded article produced using the thermoplastic resin composition.

The second invention relates to a method for producing a graft copolymer having excellent production stability and excellent storage stability, a method for producing a thermoplastic resin composition in which the graft copolymer is used, and a method for producing a molded article in which the thermoplastic resin composition is used.

The third invention relates to a graft copolymer which has good moldability and with which a molded article having excellent impact resistance and excellent appearance can be produced and a method for producing the graft copolymer. The third invention also relates to a method for producing a rubbery polymer with which the above graft copolymer can be produced, a thermoplastic resin composition including the graft copolymer, and a molded article produced using the thermoplastic resin composition.

BACKGROUND ART

Thermoplastic resins have been used in various fields, such as automobiles, housing and building materials, electrical and electronic equipment, and OA instruments (e.g., printers). Among the thermoplastic resins, an ABS resin and an ASA resin, which are produced by mixing a styrene-acrylonitrile copolymer resin, an α-methylstyrene-acrylonitrile copolymer resin, a styrene-acrylonitrile-phenylmaleimide copolymer resin, or the like with a graft copolymer prepared by grafting a monomer capable of enhancing compatibility with the above resin to a rubbery polymer, have been widely used because of their excellent impact resistance and fluidity.

In particular, an ASA resin produced using constituents such as an alkyl (meth)acrylate rubber, which is a saturated rubber, as a rubbery polymer has good weather resistance but lower impact resistance than an ABS resin. In order to enhance the impact resistance of an ASA resin, there have been proposed an ASA resin that includes an alkyl (meth) acrylate rubber having a specific particle size (PTL 1) and an ASA resin that includes alkyl (meth)acrylate rubbers having different particle sizes (PTL 2).

In PTL 1, large particles are formed by seed polymerization. This results in an excessively long production time and poor productivity. Furthermore, small acrylate rubber particles may also be formed, which degrade moldability.

In PTL 2, large particles are formed by coagulation using an acidic-group-containing copolymer latex. This results in excellent productivity but an impact resistance lower than that of an acrylate rubber having a uniform and large particle size. Furthermore, it is necessary to increase the content of a rubbery polymer in a thermoplastic resin composition for enhancing the impact resistance of the ASA resin to a sufficiently high level. Increasing the proportion of the rubbery polymer may degrade moldability.

PTL 1: Japanese Patent 5805066
PTL 2: Japanese Patent Publication 2012-214734 A

SUMMARY OF INVENTION

An object of the first invention is to provide a graft copolymer which has good moldability and good continuous moldability and with which a thermoplastic resin molded article having excellent impact resistance can be produced, a method for producing the graft copolymer, a thermoplastic resin composition including the graft copolymer, and a molded article produced using the thermoplastic resin composition. Another object of the first invention is to provide a method for producing a rubbery polymer with which the above graft copolymer can be produced.

The inventors of the first invention found that the above objects may be attained by a graft copolymer produced using a rubbery polymer mixture including a rubbery polymer and a specific hydrophobic substance, the rubbery polymer produced by polymerizing an alkyl (meth)acrylate and a multifunctional monomer copolymerizable with the alkyl (meth) acrylate.

The summary of the first invention is as follows.

[1] A graft copolymer (B-I) produced by grafting at least one vinyl monomer (b-I) selected from the group consisting of an aromatic vinyl, an alkyl (meth)acrylate, and a vinyl cyanide to a rubbery polymer mixture including a rubbery polymer (A-I) and a hydrophobic substance, the rubbery polymer (A-I) including an alkyl (meth)acrylate unit and a multifunctional monomer unit copolymerizable with an alkyl (meth)acrylate, the hydrophobic substance having a kinematic viscosity of 5 $mm^2/s$ or more at 40° C. or a kinematic viscosity of 2 to 4 $mm^2/s$ at 100° C., a principal constituent of the hydrophobic substance being a hydrocarbon.

[2] The graft copolymer (B-I) according to [1], wherein the amount of the multifunctional monomer unit is 0.1 to 5.0 parts by mass relative to 100 parts by mass of the total amount of the alkyl (meth)acrylate unit and the multifunctional monomer unit.

[3] The graft copolymer (B-I) according to [1] or [2], wherein the ratio between the rubbery polymer (A-I) and the vinyl monomer (b-I) is such that the proportion of the rubbery polymer (A-I) is 10% to 90% by mass and the proportion of the vinyl monomer (b-I) is 90% to 10% by mass (with the total proportion of the rubbery polymer (A-I) and the vinyl monomer (b-I) being 100% by mass).

[4] The graft copolymer (B-I) according to any one of [1] to [3], wherein the rubbery polymer mixture is a polymerization product produced by polymerizing a miniemulsion containing the alkyl (meth)acrylate, the multifunctional monomer, the hydrophobic substance, an emulsifier, and water.

[5] The graft copolymer (B-I) according to [4], wherein the amount of the hydrophobic substance is 0.1 to 10 parts by mass relative to 100 parts by mass of the alkyl (meth) acrylate.

[6] The graft copolymer (B-I) according to [4] or [5], wherein the rubbery polymer (A-I) included in the polymerization product has a volume-average particle size of less than 1000 nm.

[7] A thermoplastic resin composition comprising the graft copolymer (B-I) according to any one of [1] to [6].

[8] A molded article produced using the thermoplastic resin composition according to [7].

[9] A method for producing a rubbery polymer (A-I), the method comprising a miniemulsion formation step in which a mixture (a-I) containing an alkyl (meth)acrylate, a multifunctional monomer copolymerizable with the alkyl (meth)acrylate, a hydrophobic substance, an emulsifier, and water is formed into a miniemulsion, the hydrophobic substance having a kinematic viscosity of 5 mm$^2$/s or more at 40° C. or a kinematic viscosity of 2 to 4 mm$^2$/s at 100° C., a principal constituent of the hydrophobic substance being a hydrocarbon, and a polymerization step in which the miniemulsion is polymerized.

[10] A method for producing a graft copolymer (B-I), the method comprising grafting at least one vinyl monomer (b-I) selected from the group consisting of an aromatic vinyl, an alkyl (meth)acrylate, and a vinyl cyanide to a rubbery polymer (A-I) produced by the method for producing a rubbery polymer (A-I) according to [9].

[11] A method for producing a thermoplastic resin composition, the method comprising using a graft copolymer (B-I) produced by the method for producing a graft copolymer (B-I) according to [10].

[12] A method for producing a molded article, the method comprising using a thermoplastic resin composition produced by the method for producing a thermoplastic resin composition according to [11].

An object of the second invention is to provide a method for producing a graft copolymer having excellent production stability and excellent storage stability; a thermoplastic resin composition using the graft copolymer and being capable of producing a thermoplastic resin molded article having excellent impact resistance with good moldability; and a method for producing a molded article of the thermoplastic resin composition.

The inventors of the second invention found that the above objects may be attained by a graft copolymer produced using a rubbery polymer prepared by polymerizing a pre-emulsion that is formed using a mixture containing an alkyl (meth)acrylate, a multifunctional monomer copolymerizable with the alkyl (meth)acrylate, an oil-soluble initiator having a predetermined number of carbon atoms, an emulsifier, and water.

The summary of the second invention is as follows.

[13] A method for producing a graft copolymer (B-II), the method comprising a miniemulsion formation step in which a mixture (a-II) containing an alkyl (meth)acrylate, a multifunctional monomer copolymerizable with the alkyl (meth)acrylate, an oil-soluble initiator having 16 or more carbon atoms, an emulsifier, and water is formed into a miniemulsion, a polymerization step in which the miniemulsion is polymerized to form a rubbery polymer (A-II), and a graft polymerization step in which at least one vinyl monomer (b-II) selected from the group consisting of an aromatic vinyl, an alkyl (meth)acrylate, and a vinyl cyanide is grafted to the rubbery polymer (A-II) in order to produce a graft copolymer (B-II).

[14] The method for producing a graft copolymer (B-II) according to [13], wherein the amount of the multifunctional monomer is 0.1 to 5.0 parts by mass relative to 100 parts by mass of the total amount of the alkyl (meth)acrylate and the multifunctional monomer.

[15] The method for producing a graft copolymer (B-II) according to [13] or [14], wherein the ratio between the rubbery polymer (A-II) and the vinyl monomer (b-II) is such that the proportion of the rubbery polymer (A-II) is 10% to 90% by mass and the proportion of the vinyl monomer (b-II) is 90% to 10% by mass (with the total proportion of the rubbery polymer (A-II) and the vinyl monomer (b-II) being 100% by mass).

[16] The method for producing a graft copolymer (B-II) according to any one of [13] to [15], wherein the amount of the oil-soluble initiator used is 0.001 to 5 parts by mass relative to 100 parts by mass of the alkyl (meth)acrylate.

[17] The method for producing a graft copolymer (B-II) according to any one of [13] to [16], wherein the amount of the emulsifier used is 0.01 to 1.0 parts by mass relative to 100 parts by mass of the alkyl (meth)acrylate.

[18] A method for producing a thermoplastic resin composition, the method comprising using a graft copolymer (B-II) produced by the production method according to any one of [13] to [17].

[19] A method for producing a molded article, the method comprising molding a thermoplastic resin composition produced by the production method according to [18].

[20] A graft copolymer (B-II) produced by grafting at least one vinyl monomer (b-II) selected from the group consisting of an aromatic vinyl, an alkyl (meth)acrylate, and a vinyl cyanide to a rubbery polymer (A-II) produced by miniemulsion polymerization of a mixture (a-II) containing an alkyl (meth)acrylate, a multifunctional monomer copolymerizable with the alkyl (meth)acrylate, an oil-soluble initiator having 16 or more carbon atoms, an emulsifier, and water.

[21] A thermoplastic resin composition comprising the graft copolymer (B-II) according to [20].

[22] A molded article produced by molding the thermoplastic resin composition according to [21].

An object of the third invention is to provide a graft copolymer which has good moldability and with which a thermoplastic resin molded article having excellent impact resistance and excellent appearance can be produced, a method for producing the graft copolymer, a thermoplastic resin composition including the graft copolymer, and a molded article produced using the thermoplastic resin composition. Another object of the third invention is to provide a method for producing a rubbery polymer with which the above graft copolymer can be produced.

The inventors of the third invention found that the above objects may be attained by a graft copolymer that includes a rubbery polymer and a graft layer, the rubbery polymer being produced by polymerizing a pre-emulsion containing specific two alkyl (meth)acrylates, a multifunctional monomer copolymerizable with the alkyl (meth)acrylates, an emulsifier, and water.

The summary of the third invention is as follows.

[23] A graft copolymer (B-III) comprising a rubbery polymer (A-III) and a graft layer (g), the rubbery polymer (A-III) being a polymerization product produced by polymerizing a pre-emulsion containing an alkyl (meth)acrylate, a multifunctional monomer copolymerizable with the alkyl (meth)acrylate, an emulsifier, and water, the graft layer (g) being formed by grafting at least one vinyl monomer selected from the group consisting of an aromatic vinyl, an alkyl (meth)acrylate, and a vinyl cyanide to the rubbery polymer (A-III), the alkyl (meth)acrylate including an alkyl (meth)acrylate having 1 to 11 carbon atoms and an alkyl (meth)acrylate having 12 to 30 carbon atoms.

[24] The graft copolymer (B-III) according to [23], wherein the amount of the alkyl (meth)acrylate having 12 to 30 carbon atoms is 0.1 to 50 parts by mass relative to 100 parts by mass of the total amount of the alkyl (meth)acrylate having 1 to 11 carbon atoms and the alkyl (meth)acrylate having 12 to 30 carbon atoms.

[25] A graft copolymer (B-III) according to [23] or [24], wherein the amount of the multifunctional monomer is 0.1 to 5.0 parts by mass relative to 100 parts by mass of the total amount of the alkyl (meth)acrylate and the multifunctional monomer.

[26] The graft copolymer (B-III) according to any one of [23] to [25], wherein the graft layer (g) is produced by polymerizing the vinyl monomer with the rubbery polymer (A-III) such that the proportion of the rubbery polymer (A-III) is 10% to 90% by mass and the proportion of the vinyl monomer is 90% to 10% by mass (with the total proportion of the rubbery polymer (A-III) and the vinyl monomer being 100% by mass).

[27] The graft copolymer (B-III) according to any one of [23] to [26], wherein the rubbery polymer (A-III) included in the polymerization product of the pre-emulsion has a volume-average particle size of less than 1000 nm.

[28] A thermoplastic resin composition comprising the graft copolymer (B-III) according to any one of [23] to [27].

[29] A molded article produced using the thermoplastic resin composition according to [28].

[30] A method for producing a rubbery polymer (A-III), the method comprising a step in which a pre-emulsion is prepared using an alkyl (meth)acrylate, a multifunctional monomer copolymerizable with the alkyl (meth)acrylate, an emulsifier, and water, and a step in which the emulsion is polymerized, the alkyl (meth)acrylate including an alkyl (meth)acrylate having 1 to 11 carbon atoms and an alkyl (meth)acrylate having 12 to 30 carbon atoms.

[31] A method for producing a graft copolymer (B-III), the method comprising grafting at least one vinyl monomer (b-III) selected from the group consisting of an aromatic vinyl, an alkyl (meth)acrylate, and a vinyl cyanide to a rubbery polymer (A-III) produced by the method for producing a rubbery polymer (A-III) according to [30] in order to form a graft layer (g).

[32] A method for producing a thermoplastic resin composition, the method comprising using a graft copolymer (B-III) produced by the production method according to [31].

[33] A method for producing a molded article, the method comprising using a thermoplastic resin composition produced by the production method according to [32].

ADVANTAGEOUS EFFECTS OF INVENTION

The graft copolymer according to the first invention enables the production of a thermoplastic resin composition having good moldability and good continuous moldability and a molded article having excellent impact resistance.

According to the second invention, a graft copolymer having excellent production stability and excellent storage stability may be produced. According to the second invention, a thermoplastic resin composition having excellent moldability may be produced using the graft copolymer. Furthermore, a molded article having excellent impact resistance may be produced using the thermoplastic resin composition.

The graft copolymer according to the third invention enables the production of a thermoplastic resin composition having good moldability and a molded article having excellent impact resistance and excellent appearance.

BRIEF DESCRIPTION OF DRAWING

FIG. 1 is a schematic diagram illustrating a metal mold used in a gas generation and deposition test in Examples.

DESCRIPTION OF EMBODIMENTS

Embodiments of the present invention are described in detail below.

The term "unit" used herein refers to a structural portion originating from a monomer before polymerization. For example, the term "alkyl (meth)acrylate unit" refers to "structural portion originating from alkyl (meth)acrylate".

The term "(meth)acrylate" used herein refers to one or both of "acrylate" and "methacrylate".

The term "principal constituent" used herein refers to a constituent the proportion of which is 50% by mass or more, is preferably 70% by mass or more, and is more preferably 90% to 100% by mass.

The term "molded article" used herein refers to an article produced by molding a thermoplastic resin composition.

Embodiment of First Invention

A graft copolymer (B-I) according to the first invention is produced by grafting at least one vinyl monomer (b-I) selected from the group consisting of an aromatic vinyl, an alkyl (meth)acrylate, and a vinyl cyanide to a rubbery polymer mixture including a rubbery polymer (A-I) and a hydrophobic substance, the rubbery polymer (A-I) including an alkyl (meth)acrylate unit and a multifunctional monomer unit copolymerizable with the alkyl (meth)acrylate (hereinafter, this multifunctional monomer may be referred to simply as "multifunctional monomer"), the hydrophobic substance having a kinematic viscosity of 5 mm$^2$/s or more at 40° C. or a kinematic viscosity of 2 to 4 mm$^2$/s at 100° C., a principal constituent of the hydrophobic substance being a hydrocarbon (hereinafter, this hydrophobic substance may be referred to simply as "hydrophobic substance").

[Rubbery Polymer (A-I)]

The rubbery polymer (A-I) (hereinafter, may be referred to as "rubbery polymer (A-I) according to the first invention") included in the rubbery copolymer mixture according to the first invention is described below.

The rubbery polymer (A-I) according to the first invention is produced in the form of a mixture containing the rubbery polymer (A-I) and a hydrophobic substance, the mixture being produced by polymerizing a miniemulsion prepared preferably using a mixture of an alkyl (meth)acrylate, a multifunctional monomer, a hydrophobic substance, and an emulsifier and more preferably using a mixture of an alkyl (meth)acrylate, a multifunctional monomer, a hydrophobic substance, an emulsifier, and water.

A method for producing the rubbery polymer (A-I) according to the first invention by miniemulsion polymerization, that is, by polymerizing a miniemulsion prepared using a mixture of an alkyl (meth)acrylate, a multifunctional monomer, a hydrophobic substance, an emulsifier, and water, is described below.

<Mechanisms of Miniemulsion>

In miniemulsion polymerization, monomer oil droplets having a size of about 100 to 1000 nm are prepared by applying a large shearing force to the mixture with an ultrasonic generator or the like. In this process, the molecules of the emulsifier adsorb preferentially onto the surfaces of the monomer oil droplets and, consequently, free emulsifier molecules and micelles are substantially not contained in the aqueous medium. Thus, in ideal miniemulsion polymerization, monomer radicals are not distributed to a water phase and an oil phase, but the monomer oil droplets serve as nuclei of particles whereby the polymerization proceeds. Consequently, the monomer oil droplets are converted directly into polymer particles. This enables the production of homogeneous polymer nanoparticles. The graft copolymer (B-I) produced using the nanoparticles of the rubbery polymer (A-I) prepared in the above-described manner enables impact resistance to be improved to a sufficient level.

In contrast, in the case where polymer particles are prepared by common emulsion polymerization, the monomer oil droplets are converted into micelles during the reaction. Therefore, when a plurality of monomers having different degrees of hydrophobicity are used, the likelihood of monomer oil droplets being converted into micelles varies by monomer and, consequently, it becomes not possible to form homogeneous polymer.

<Miniemulsion Polymerization>

Examples of miniemulsion polymerization used for producing the rubbery polymer (A-I) according to the first invention include, but are not limited to, a method including the following steps: mixing monomers including at least an alkyl (meth)acrylate and a multifunctional monomer with an emulsifier, a hydrophobic substance, and, preferably, a radical polymerization initiator; applying a shearing force to the resulting mixture (hereinafter, may be referred to as "mixture (a-I)") in order to prepare a pre-emulsion; and heating the emulsion to a polymerization initiation temperature in order to polymerize the emulsion.

In miniemulsion polymerization, after the polymerizable monomers have been mixed with the emulsifier, a shearing process is performed using ultrasonic irradiation or the like. This causes the monomers to be torn by the shearing force and forms monomer oil microdroplets covered with the emulsifier. The monomer oil microdroplets are subsequently heated to the polymerization initiation temperature of the radical polymerization initiator to be directly polymerized. Hereby, high-molecular microparticles are formed. For applying the shearing force to the mixture in the preparation of the miniemulsion, any publicly known method may be used.

A high-shear apparatus that can be used for preparing the miniemulsion is not limited to the above apparatus; for example, an emulsification apparatus that includes a high-pressure pump and an interaction chamber and an apparatus that forms a miniemulsion by using ultrasonic energy or a high-frequency wave may be used. Examples of the emulsification apparatus that includes a high-pressure pump and an interaction chamber include "Microfluidizer" produced by Powrex Corporation. Examples of the apparatus that forms a miniemulsion by using ultrasonic energy or a high-frequency wave include "Sonic Dismembrator" produced by Fisher Scient and "ULTRASONIC HOMOGENIZER" produced by NIHONSEIKI KAISHA LTD.

The amount of the water solvent used for preparing the miniemulsion is preferably about 100 to 500 parts by mass relative to 100 parts by mass of the mixture (a-I) excluding water in order to set the solid component concentration in the reaction system after polymerization to about 5% to 50% by mass in consideration of workability, stability, productivity, and the like.

<Alkyl (Meth)Acrylate>

Examples of the alkyl (meth)acrylate constituting the rubbery polymer (A-I) according to the first invention include alkyl acrylates including an alkyl group having 1 to 22 carbon atoms, such as methyl acrylate, ethyl acrylate, n-propyl acrylate, n-butyl acrylate, 2-ethylhexyl acrylate, lauryl acrylate, and stearyl acrylate; and alkyl methacrylates including an alkyl group having 1 to 22 carbon atoms, such as hexyl methacrylate, 2-ethylhexyl methacrylate, n-dodecyl methacrylate, lauryl methacrylate, and stearyl methacrylate. Among the above alkyl (meth)acrylates, n-butyl acrylate is preferable because it enhances the impact resistance and glossiness of a molded article produced using the thermoplastic resin composition. The above alkyl (meth)acrylates may be used alone or in combination of two or more.

<Multifunctional Monomer>

In the production of the rubbery polymer (A-I) according to the first invention, a multifunctional monomer is used in combination with the alkyl (meth)acrylate in order to introduce a crosslinked structure to the poly(alkyl (meth)acrylate) component originating from the alkyl (meth)acrylate. The crosslinking portions of the crosslinked rubbery polymer (A-I) produced using a multifunctional monomer also serve as a graft junction at which the vinyl monomer (b-I) described below is grafted to the rubbery polymer (A-I) in the production of the graft copolymer (B-I) according to the first invention.

Examples of the multifunctional monomer include allyl (meth)acrylate, butylene di(meth)acrylate, ethylene glycol di(meth)acrylate, propylene glycol di(meth)acrylate, 1,3-butylene glycol di(meth)acrylate, 1,4-butylene glycol di(meth)acrylate, triallyl cyanurate, and triallyl isocyanurate. The above multifunctional monomers may be used lone or in combination of two or more.

The amount of the multifunctional monomer used is preferably, but not limited to, 0.1 to 5.0 parts by mass relative to 100 parts by mass of the total amount of the multifunctional monomer and the alkyl (meth)acrylate.

The amount of multifunctional monomer unit included in the rubbery polymer (A-I) according to the first invention is preferably 0.1 to 5.0 parts by mass relative to 100 parts by mass of the total amount of the multifunctional monomer unit and the alkyl (meth)acrylate unit.

If the proportion of the multifunctional monomer used is lower than the above lower limit, a sufficient crosslinked structure may fail to be formed by using the multifunctional monomer in combination with the alkyl (meth)acrylate and, consequently, impact resistance may fail to be enhanced. If the proportion of the multifunctional monomer used is higher than the above upper limit, the properties of a rubber may fail to be achieved as a result of excessive crosslinking and, consequently, impact resistance may become degraded.

<Hydrophobic Substance>

Addition of a hydrophobic substance in the formation of the miniemulsion is likely to further enhance stability. Using a hydrophobic substance also limits an increase in variation in particle size which results from Ostwald ripening and enables the synthesis of a monodisperse latex particles.

Examples of the hydrophobic substance include nonpolymerizable hydrophobic compounds. Examples thereof include hydrocarbons having 10 or more carbon atoms, alcohols having 10 or more carbon atoms, hydrophobic polymers having a mass-average molecular weight (Mw) of less than 10000, hydrophobic monomers, such as a vinyl ester of an alcohol having 10 to 30 carbon atoms, a vinyl ether of an alcohol having 12 to 30 carbon atoms, a vinyl ester of a carboxylic acid having 10 to 30 carbon atoms (preferably 10 to 22 carbon atoms), and p-alkylstyrene, hydrophobic chain-transfer agents, and hydrophobic peroxides. The above hydrophobic substances may be used alone or in a mixture of two or more.

In the first invention, among the above hydrophobic substances, hydrophobic substances having a kinematic viscosity of 5 $mm^2/s$ or more, preferably 20 $mm^2/s$ or more, and further preferably 30 $mm^2/s$ or more at 40° C. are used when the hydrophobic substances are liquid at room temperature, and hydrophobic substances having a kinematic viscosity of 2 to 4 mm$^2$/s and preferably 2.5 to 3.5 mm$^2$/s at 100° C. are used when the hydrophobic substances are solid at room temperature. Using a hydrophobic substance having a kinematic viscosity that falls within the above range reduces the amount of gas generated during molding, accordingly enhances continuous moldability, and is desirable in terms of impact resistance.

In the first invention, the kinematic viscosity of the hydrophobic substance is measured in accordance with ASTM-D445.

Specific examples of the hydrophobic substance include liquid paraffin, liquid isoparaffin, a paraffin wax, a polyethylene wax, an olive oil, and a polystyrene, a poly (meth) acrylate, and a polybutylene glycol that have a mass-average molecular weight (Mw) of 500 to 10000.

The amount of the hydrophobic substance used is preferably 0.1 to 10 parts by mass and is further preferably 1 to 3 parts by mass relative to 100 parts by mass of the alkyl (meth)acrylate. If the amount of the hydrophobic substance used is smaller than the above lower limit, the impact resistance of the graft copolymer (B-I) fails to be enhanced by a sufficient degree. If the amount of the hydrophobic substance used is larger than the above upper limit, a large amount of gas may be deposited on the metal mold during molding, which degrades continuous moldability.

<Emulsifier>

Examples of the emulsifier used for producing the rubbery polymer (A-I) include the following publicly known emulsifiers: carboxylic acid emulsifiers, such as alkali metal salts of oleic acid, palmitic acid, stearic acid, and rosin acid and alkali metal salts of alkenylsuccinic acid; and anionic emulsifiers, such as an alkyl sulfuric acid ester, sodium alkylbenzene sulfonate, sodium alkyl sulfosuccinate, and polyoxyethylene nonylphenyl ether sulfate ester sodium. The above emulsifiers may be used alone or in combination of two or more.

The amount of the emulsifier used is preferably 0.01 to 1.0 parts by mass and is further preferably 0.05 to 0.5 parts by mass relative to 100 parts by mass of the alkyl (meth) acrylate.

<Radical Polymerization Initiator>

As a radical polymerization initiator used in the polymerization step subsequent to the miniemulsification step, a known one can be used. Examples of radical polymerization initiators include azo polymerization initiators, photopolymerization initiators, inorganic peroxides, organic peroxides, and redox initiators containing organic peroxides, transition metals, and reducing agents in combination. Of these, azo polymerization initiators, inorganic peroxides, organic peroxides, and redox initiators, which are capable of initiating polymerization upon heating, are preferred. The radical initiators may be used alone or in a combination of two or more.

Examples of azo polymerization initiators include 2,2'-azobis(4-methoxy-2,4-dimethylvaleronitrile), 2,2'-azobis(2,4-dimethylvaleronitrile), 2,2'-azobisisobutyronitrile, 2,2'-azobis(2-methylbutyronitrile), 1,1'-azobis(cyclohexane-1-carbonitrile), 1-[(1-cyano-1-methylethyl)azo]formamide, 4,4'-azobis(4-cyanovaleric acid), dimethyl 2,2'-azobis(2-methyl propionate), dimethyl 1,1'-azobis(1-cychexanecarboxylate), 2,2'-azobis[2-methyl-N-(2-hydroxyethyl)propionamide], 2,2'-azobis(N-butyl-2-methylpropionamide), 2,2'-azobis(N-cyclohexyl-2-methylpropionamide), 2,2'-azobis [2-(2-imidazolin-2-yl)propane], and 2,2'-azobis(2,4,4-trimethylpentane).

Examples of inorganic peroxides include potassium persulfate, sodium persulfate, ammonium persulfate, and hydrogen peroxide.

Examples of organic peroxides include peroxyester compounds. Specific examples thereof include α,α'-bis(neodecanoylperoxy)diisopropylbenzene, cumyl peroxyneodecanoate, 1,1,3,3-tetramethylbutyl peroxyneodecanoate, 1-cyclohexyl-1-methylethyl peroxyneodecanoate, t-hexyl peroxyneodecanoate, t-butyl peroxyneodecanoate, t-hexyl peroxypivalate, t-butyl peroxypivalate, 1,1,3,3-tetramethylbutyl peroxy-2-ethylhexanoate, di(3,3,5-trimethylhexanoyl) peroxide, 2,5-dimethyl-2,5-bis(2-ethylhexanoylperoxy) hexane, 1-cyclohexyl-1-methylethyl peroxy-2-ethylhexanoate, t-hexyl peroxy-2-hexylhexanoate, t-butyl peroxy-2-hexylhexanoate, t-butyl peroxyisobutyrate, t-hexyl peroxyisopropylmonocarbonate, t-butyl peroxymaleic acid, t-butyl peroxy-3,5,5-trimethylhexanoate, t-butyl peroxylaurate, 2,5-dimethyl-2,5-bis(m-toluoylperoxy)hexane, t-butyl peroxyisopropylmonocarbonate, t-butyl peroxy-2-ethylhexylmonocarbonate, t-hexyl peroxybenzoate, 2,5-dimethyl-2,5-bis(benzoylperoxy)hexane, t-butyl peroxyacetate, t-butyl peroxy-m-toluoylbenzoate, t-butyl peroxybenzoate, bis(t-butylperoxy) isophthalate, 1,1-bis(t-hexylperoxy)3,3,5-trimethylcyclohexane, 1,1-bis(t-hexylperoxy)cyclohexane, 1,1-bis(t-butylperoxy)3,3,5-trimethylcyclohexane, 1,1-bis(t-butylperoxy)cyclohexane, 1,1-bis(t-butylperoxy) cyclododecane, 2,2-bis(t-butylperoxy)butane, n-butyl 4,4-bis(t-butylperoxy)valerate, 2,2-bis(4,4-di-t-butylperoxycyclohexyl)propane, α,α'-bis(t-butylperoxide) diisopropylbenzene, dicumyl peroxide, 2,5-dimethyl-2,5-bis (t-butylperoxy)hexane, t-butyl cumyl peroxide, di-t-butylperoxide, cumene hydroperoxide, diisopropylbenzene hydroperoxide, dilauroyl peroxide, diisononanoyl peroxide, bis(4-t-butylcyclohexyl) peroxydicarbonate, t-butyl hydroperoxide, benzoyl peroxide, lauroyl peroxide, dimethylbis(t-butylperoxy)hexyne-3, bis(t-butylperoxyisopropyl)benzene, bis(t-butylperoxy)trimethylcyclohexane, 2,2-bis(4,4-di-t-butylperoxycyclohexyl)propane, butyl-bis(t-butylperoxy) valerate, t-butyl peroxy-2-ethylhexanoate, dibenzoyl peroxide, paramenthane hydroperoxide, and t-butyl peroxybenzoate.

As a redox initiator, a combination of an organic peroxide, ferrous sulfate, a chelating agent, and a reducing agent is preferred. Examples include a combination of cumene hydroperoxide, ferrous sulfate, sodium pyrophosphate, and dextrose and a combination of t-butyl hydroperoxide, sodium formaldehyde sulfoxylate (Rongalite), ferrous sulfate, and disodium ethylenediaminetetraacetate.

The addition amount of radical initiator is typically 5 parts by mass or less, preferably 3 parts by mass or less, for example 0.001 to 3 parts by mass, relative to 100 parts by mass of the alkyl (meth)acrylate.

The radical polymerization initiator may be added before or after the miniemulsion is formed and may be added in one portion, in multiple portions, or in a continuous manner.

<Rubber Component>

A rubbery polymer (A-I) that is a rubber composite may be produced by adding another rubber component to the mixture (a-I) in the production of the rubbery polymer (A-I) according to the first invention such that the desired properties are not impaired. Examples of the other rubber component include diene rubbers, such as polybutadiene, and polyorganosiloxane. Polymerizing the alkyl (meth)acrylate in the presence of the above rubber components produces a rubbery polymer (A-I) that is a diene/alkyl (meth)acrylate rubber composite or a polyorganosiloxane/alkyl (meth) acrylate rubber composite, which contains an alkyl (meth)

acrylate rubber, such as a butyl acrylate rubber. The rubber composite according to the first invention is not limited to the above rubber composites. The rubber components that can be included in the rubber composite may be used alone or in combination of two or more.

<Reaction Conditions>

The miniemulsion formation step is conducted normally at room temperature (about 10° C. to 50° C.). The polymerization step subsequent to the miniemulsion formation step is conducted normally at 40° C. to 100° C. for about 30 to 600 minutes.

<Particle Size>

The volume-average particle size of the rubbery polymer (A-I) according to the first invention which can be produced by the miniemulsion polymerization described above is preferably 1000 nm or less, that is, for example, 100 to 600 nm, in consideration of polymerization stability. The volume-average particle size of the rubbery polymer (A-I) is measured by the method described in Examples below.

[Graft Copolymer (B-I)]

The graft copolymer (B-I) according to the first invention is produced by grafting at least one vinyl monomer (b-I) selected from an aromatic vinyl, an acryl (meth)acrylate, and a vinyl cyanide to a rubbery polymer mixture (hereinafter, may be referred to as "latex") that includes the rubbery polymer (A-I) according to the first invention, which is produced in the above-described manner, and the hydrophobic substance.

The graft copolymer (B-I) according to the first invention may further include a vinyl monomer other than an aromatic vinyl, an alkyl (meth)acrylate, or a vinyl cyanide which is grafted thereto.

Using a mixture of an aromatic vinyl, which is preferably styrene, with a vinyl cyanide, which is preferably acrylonitrile, as a vinyl monomer (b-I), advantageously enhances the thermal stability of the graft copolymer (B-I). In such a case, the ratio between the amounts of the aromatic vinyl, such as styrene, and the vinyl cyanide, such as acrylonitrile, is preferably set such that the amount of aromatic vinyl is 50% to 90% by mass relative to 10% to 50% by mass of vinyl cyanide (with the total amount of aromatic vinyl and vinyl cyanide being 100% by mass).

The graft copolymer (B-I) is preferably an emulsion graft copolymer produced by grafting 90% to 10% by mass vinyl monomer (b-I) to 10% to 90% by mass rubbery polymer (A-I) in order to enhance the appearance of the molded article (with the total amount of the rubbery polymer (A-I) and the vinyl monomer (b-I) being 100 mass %). The above ratio is further preferably set such that the proportion of the rubbery polymer (A-I) is 30% to 70% by mass and the proportion of the vinyl monomer (b-I) is 70% to 30% by mass.

For grafting the vinyl monomer (b-I) to the rubbery polymer (A-I), for example, the vinyl monomer (b-I) is added to the latex containing the rubbery polymer (A-I) produced by miniemulsion polymerization and, subsequently, polymerization is performed in a single stage or multiple stages. In the case where polymerization is performed in multiple stages, it is preferable to perform polymerization while adding the vinyl monomer (b-I) in batches or continuously in the presence of the rubber latex containing the rubbery polymer (A-I). The above polymerization method achieves good polymerization stability and enables a latex having a desired particle size and a desired particle size distribution to be produced with consistency.

Examples of a polymerization initiator used for performing the graft polymerization are the same as the examples of the radical polymerization initiator used for performing the miniemulsion polymerization of the alkyl (meth)acrylate described above.

When the rubbery polymer (A-I) is polymerized with the vinyl monomer (b-I), an emulsifier may be used in order to stabilize the latex and control the average particle size of the graft copolymer (B-I). Examples of the emulsifier are not limited and may be the same as the examples of the emulsifier used in the miniemulsion polymerization of the alkyl (meth)acrylate described above. An anionic emulsifier and a nonionic emulsifier are preferable. The amount of the emulsifier used for grafting the vinyl monomer (b-I) to the rubbery polymer (A-I) is preferably, but not limited to, 0.1 to 10 parts by mass and is more preferably 0.2 to 5 parts by mass relative to 100 parts by mass of the graft copolymer (B-I).

A method for recovering the graft copolymer (B-I) from the latex containing the graft copolymer (B-I) which is produced by emulsion polymerization is not limited; for example, the following method may be used.

The latex containing the graft copolymer (B-I) is charged into hot water containing a coagulant dissolved therein in order to solidify the graft copolymer (B-I). The solidified graft copolymer (B-I) is re-dispersed in water or warm water to form a slurry in order to elute the residue of the emulsifier remaining in the graft copolymer (B-I) into water, thereby the graft copolymer (B-I) is cleaned. The slurry is then dehydrated with a dehydrator or the like. The resulting solid is dried with a flash dryer or the like. Hereby, the graft copolymer (B-I) is recovered in the form of a powder or particles.

Examples of the coagulant include inorganic acids (e.g., sulfuric acid, hydrochloric acid, phosphoric acid, and nitric acid) and metal salts (e.g., calcium chloride, calcium acetate, and aluminum sulfate). The coagulant is selected appropriately in accordance with the type of the emulsifier used. For example, any coagulant may be used in the case where the emulsifier used is only a carboxylic acid salt (e.g., a fatty acid salt or rosin acid soap). In the case where the emulsifier used is an emulsifier having a stable emulsifying capacity even in an acidic region, such as sodium alkylbenzene sulfonate, using an inorganic acid as a coagulant may be insufficient; a metal salt needs to be used as a coagulant.

The volume-average particle size of the graft copolymer (B-I) according to the first invention, which is produced using the rubbery polymer (A-I) according to the first invention in the above-described manner, is normally less than 1000 nm. The average particle size of the graft copolymer (B-I) is measured by the method described in Examples below.

[Thermoplastic Resin Composition]

The thermoplastic resin composition according to the first invention includes the graft copolymer (B-I) according to the first invention described above. The amount of graft copolymer (B-I) is preferably 20 to 60 parts by mass relative to 100 parts by mass of the thermoplastic resin composition. If the content of the graft copolymer (B-I) in the thermoplastic resin composition is less than 20 parts by mass, the amount of rubber is small and the impact resistance of the molded article may become degraded accordingly. If the content of the graft copolymer (B-I) in the thermoplastic resin composition is more than 60 parts by mass, the thermoplastic resin composition may have poor fluidity.

The amount of graft copolymer (B-I) is more preferably 30 to 40 parts by mass relative to 100 parts by mass of the thermoplastic resin composition according to the first invention in order to achieve a certain degree of fluidity, a certain degree of impact resistance of the molded article, and certain degrees of other physical properties in a balanced manner.

The thermoplastic resin composition according to the first invention may optionally include other thermoplastic resins and additives.

Examples of the other thermoplastic resins include polyvinyl chloride, polystyrene, an acrylonitrile-styrene copolymer, a styrene-acrylonitrile-N-phenylmaleimide copolymer, an α-methylstyrene-acrylonitrile copolymer, poly(methyl methacrylate), a methyl methacrylate-styrene copolymer, polycarbonate, polyamide, a polyester, such as polyethylene terephthalate or polybutylene terephthalate, and a polyphenylene ether-polystyrene blend. The above thermoplastic resins may be used alone or in combination of two or more. Among the above thermoplastic resins, an acrylonitrile-styrene copolymer is preferable in consideration of impact resistance and fluidity.

Examples of the additives include a colorant, such as a pigment or a dye, a filler (e.g., carbon black, silica, or titanium oxide), a flame retardant, a stabilizer, a reinforcing agent, a processing aid, a heat-resistant agent, an antioxidant, a weathering agent, a mold release agent, a plasticizer, and an antistatic agent.

The thermoplastic resin composition according to the first invention is produced by mixing the graft copolymer (B-I) with the optional thermoplastic resins and additives using a V-blender, a Henschel mixer, or the like and melt-kneading the resulting mixture with a kneader, such as an extruder, a Banbury mixer, a pressure kneader, or a roller.

The order in which the above constituents are mixed is not limited; the above constituents may be mixed in any order as long as all the constituents are uniformly mixed.

[Molded Article]

The molded article according to the first invention is produced by molding the thermoplastic resin composition according to the first invention and has excellent impact resistance.

For molding the thermoplastic resin composition according to the first invention, for example, injection molding, an injection compression molding machine method, extrusion, blow molding, vacuum molding, compressed air molding, calender molding, and inflation molding may be used. Among the above molding methods, injection molding and injection compression molding are preferable because they enable excellent mass productivity and the production of a molded article with high dimensional accuracy.

The molded article according to the first invention, which is produced by molding the thermoplastic resin composition according to the first invention, has excellent impact resistance and is suitably used as an automotive interior or exterior component, an OA instrument, a building material, or the like.

The molded article according to the first invention, which is produced by molding the thermoplastic resin composition according to the first invention, may be used in the following industrial applications: automotive components and, in particular, paintless interior and exterior components; building materials, such as a wall material and a window frame; tableware; toys; electric home appliances, such as a cleaner housing, a television housing, and an air-conditioner housing; interior materials; ship materials; and telecommunication equipment housings.

Embodiment of Second Invention

A method for producing the graft copolymer (B-II) according to the second invention includes a miniemulsion formation step in which a mixture (a-II) containing an alkyl (meth)acrylate, a multifunctional monomer copolymerizable with the alkyl (meth)acrylate (hereinafter, this multifunctional monomer may be referred to simply as "multifunctional monomer"), an oil-soluble initiator having 16 or more carbon atoms (hereinafter, this oil-soluble initiator may be referred to simply as "oil-soluble initiator"), an emulsifier, and water is formed into a miniemulsion, a polymerization step in which the miniemulsion is polymerized to form a rubbery polymer (A-II) (hereinafter, may be referred to as "rubbery polymer (A-II) according to the second invention"), and a graft polymerization step in which at least one vinyl monomer (b-II) selected from the group consisting of an aromatic vinyl, an alkyl (meth)acrylate, and a vinyl cyanide is grafted to the rubbery polymer (A-II) in order to produce the graft copolymer (B-II) (hereinafter, may be referred to as "graft copolymer (B-II) according to the second invention").

[Rubbery Polymer (A-II)]

A method for producing the rubbery polymer (A-II) according to the second invention is described below.

The rubbery polymer (A-II) according to the second invention is produced by conducting a miniemulsion formation step in which a mixture containing an alkyl (meth) acrylate, a multifunctional monomer, an oil-soluble initiator, an emulsifier, and water is formed into a miniemulsion by miniemulsion polymerization and a polymerization step in which the emulsion is polymerized.

The mechanisms of miniemulsion and miniemulsion polymerization are as described in the sections "Mechanisms of Miniemulsion" and "Miniemulsion Polymerization" in the first invention. The descriptions in the above sections directly apply to the second invention except that the terms "rubbery polymer (A-I)", "mixture (a-I)", and "graft copolymer (B-I)" are read as "rubbery polymer (A-II)", "mixture (a-II)", and "graft copolymer (B-II)", respectively. Note that, in the second invention, an oil-soluble initiator is used as a radical polymerization initiator.

The miniemulsion polymerization performed for producing the rubbery polymer (A-II) according to the second invention includes a step in which monomers including at least an alkyl (meth)acrylate and a multifunctional monomer, an oil-soluble initiator, and an emulsifier are mixed with water, a step in which the mixture (hereinafter, may be referred to as "mixture (a-II)") is formed into a pre-emulsion by the application of a shearing force, and a step in which the emulsion is heated to a polymerization initiation temperature to be polymerized.

The amount of the water solvent used in the preparation of the pre-emulsion is also the same as in the first invention described above.

<Alkyl (Meth)Acrylate>

Examples of the alkyl (meth)acrylate constituting the rubbery polymer (A-II) according to the second invention are the same as the examples of the alkyl (meth)acrylate constituting the rubbery polymer (A-I) according to the first invention. The alkyl (meth)acrylates may be used alone or in combination of two or more. Preferable examples of the alkyl (meth)acrylate are also the same as those of the alkyl (meth)acrylate constituting the rubbery polymer (A-I).

<Multifunctional Monomer>

The descriptions of the function, specific examples, amount, and the like of the multifunctional monomer used for producing the rubbery polymer (A-I) according to the first invention directly apply to the multifunctional monomer used for producing the rubbery polymer (A-II) according to the second invention.

<Oil-Soluble Initiator>

The oil-soluble initiator is a radical polymerization initiator soluble in oils, that is, soluble in the alkyl (meth) acrylate and the multifunctional monomer. In the second invention, at least a compound that has 16 or more carbon atoms, preferably 20 or more carbon atoms, and further preferably 22 or more carbon atoms is used as an oil-soluble initiator. Examples of the oil-soluble initiator include an azo polymerization initiator, a photopolymerization initiator, an organic peroxide, and a redox initiator that includes an organic peroxide, a transition metal, and a reductant. Among the above initiators, an azo polymerization initiator and an organic peroxide, with which polymerization can be initiated by heat, are preferable. The above initiators may be used alone or in combination of two or more.

In the second invention, an oil-soluble initiator that has a certain number or more of carbon atoms is used. This enhances the stability of the latex that has been subjected to the miniemulsion formation step and, accordingly, production stability during the polymerization step and storage stability subsequent to the polymerization step. This also limits an increase in variation in particle size which results from Ostwald ripening and enables the synthesis of a monodisperse latex particles.

In contrast, if an oil-soluble initiator having less than 16 carbon atoms is used, the stability of the pre-emulsion is poor, a large amount of coagulum may be formed in the polymerization step, and, consequently, the storage stability of the latex that has been subjected to the graft polymerization described below may become degraded. The upper limit for the number of carbon atoms included in the oil-soluble initiator is not limited but normally 31 or less.

Examples of the azo polymerization initiator include dimethyl 1,1'-azobis(1-cyclohexanecarboxylate), 2,2'-azobis (N-butyl-2-methylpropionamide), 2,2'-azobis(N-cyclohexyl-2-methylpropionamide), and 2,2'-azobis(2,4,4-trimethylpentane).

Examples of the organic peroxide include peroxy esters. Specific examples thereof include α,α'-bis(neodecanoylperoxy)diisopropylbenzene, cumyl peroxyneodecanoate, t-hexyl peroxyneodecanoate, 1,1,3,3-tetramethylbutyl peroxyneodecanoate, 1-cyclohexyl-1-methylethyl peroxyneodecanoate, 1,1,3,3-tetramethylbutyl peroxy-2-ethylhexanoate, di(3,3,5-trimethylhexanoyl) peroxide, 2,5-dimethyl-2,5-bis(2-ethylhexanoylperoxy)hexane, 1-cyclohexyl-1-methylethyl peroxy-2-ethylhexanoate, t-hexyl peroxy 2-hexyl hexanoate, bis(4-t-butylcyclohexyl) peroxydicarbonate, 2,5-dimethyl-2,5-bis(m-toluoylperoxy)hexane, 2,5-dimethyl-2,5-bis(benzoylperoxy)hexane, 1,1-bis(t-hexylperoxy)3,3,5-trimethyl cyclohexane, 1,1-bis(t-hexylperoxy) cyclohexane, 1,1-bis(t-butylperoxy)3,3,5-trimethylcyclohexane, 1,1-bis(t-butylperoxy)cyclododecane, n-butyl-4,4-bis(t-butylperoxy)valerate, 2,2-bis(4,4-di-t-butylperoxycyclohexyl)propane, α,α'-bis(t-butylperoxy) diisopropylbenzene, dilauroyl peroxide, diisononanoyl peroxide, dicumyl peroxide, 2,2-bis(4,4-di-t-butylperoxycyclohexyl)propane, 2,5-dimethyl-2,5-bis(t-butylperoxy) hexane, dimethyl bis(t-butylperoxy)-3-hexyne, 1,4-bis(t-butylperoxyisopropyl)benzene, 1,1-bis(t-butylperoxy)-3,3, 5-trimethylcyclohexane, and butyl 4,4-bis(t-butylperoxy) valerate.

The amount of the oil-soluble initiator used is 0.001 to 5 parts by mass and is preferably 0.1 to 3 parts by mass relative to 100 parts by mass of the alkyl (meth)acrylate.

<Emulsifier>

The descriptions of the specific examples, amount, and the like of the emulsifier used for producing the rubbery polymer (A-I) according to the first invention directly apply to the emulsifier used for producing the rubbery polymer (A-II) according to the second invention.

<Hydrophobic Substance>

A hydrophobic substance may be used in the production of the rubbery polymer (A-II) according to the second invention in an amount at which the desired properties of the second invention are not impaired. Using a hydrophobic substance in the formation of the pre-emulsion may further enhance the stability with which the miniemulsion polymerization is performed.

Examples of the hydrophobic substance include nonpolymerizable hydrophobic compounds, such as hydrocarbons having 10 or more carbon atoms and alcohols having 10 or more carbon atoms; hydrophobic polymers having a mass-average molecular weight (Mw) of less than 10000; hydrophobic monomers, such as a vinyl ester of an alcohol having 10 to 30 carbon atoms, a vinyl ether of an alcohol having 12 to 30 carbon atoms, a vinyl ester of a carboxylic acid having 10 to 30 carbon atoms (preferably 10 to 22 carbon atoms), and p-alkylstyrene; and hydrophobic chain-transfer agents. The above hydrophobic substances may be used alone or in a mixture of two or more.

Specific examples of the hydrophobic substance include decane, undecane, dodecane, tridecane, tetradecane, pentadecane, hexadecane, octadecane, icosane, liquid paraffin, liquid isoparaffin, a paraffin wax, a polyethylene wax, an olive oil, polystyrene, polybutylene glycol, and poly(meth) acrylate that have a mass-average molecular weight (Mw) of 500 to 5000, siloxane having a mass-average molecular weight (Mw) of 500 to 5000, cetyl alcohol, stearyl alcohol, palmityl alcohol, behenyl alcohol, p-methylstyrene, 2-ethylhexyl acrylate, decyl acrylate, stearyl acrylate, lauryl methacrylate, stearyl methacrylate, and lauryl mercaptan (n-dodecyl mercaptan).

In the case where the hydrophobic substance is used, the amount of the hydrophobic substance used is preferably 0.1 to 10 parts by mass and is further preferably 0.4 to 3 parts by mass relative to 100 parts by mass of the alkyl (meth) acrylate for the same reasons as in the first invention.

<Rubber Component>

A rubbery polymer (A-II) that is a rubber composite may be produced by adding another rubber component to the mixture (a-II) in the production of the rubbery polymer (A-II) according to the second invention such that the desired properties are not impaired.

The descriptions of the rubber component used for producing the rubbery polymer (A-I) according to the first invention directly apply to the rubber component used for producing the rubbery polymer (A-II).

<Reaction Conditions>

The miniemulsion formation step and the polymerization step subsequent to the miniemulsion formation step are conducted under the same reaction conditions as in the first invention.

<Particle Size>

The volume-average particle size of the rubbery polymer (A-II) according to the second invention which can be produced by the miniemulsion polymerization method described above is preferably 1000 nm or less, that is, for example, 100 to 600 nm, in consideration of polymerization stability. The volume-average particle size of the rubbery polymer (A-II) is measured by the method described in Examples below.

[Graft Copolymer (B-II)]

The graft copolymer (B-II) according to the second invention is produced by conducting a graft polymerization step in which at least one vinyl monomer (b-II) selected from an aromatic vinyl, an acryl (meth)acrylate, and a vinyl cyanide is grafted to the rubbery polymer (A-II) according to the second invention prepared by the above method.

The graft copolymer (B-II) may further include a vinyl monomer other than an aromatic vinyl, an alkyl (meth) acrylate, or a vinyl cyanide which is grafted thereto.

The descriptions of the graft copolymer (B-I) according to the first invention directly apply to the suitable ratio between the amounts of the aromatic vinyl and the vinyl cyanide included in the vinyl monomer (b-II) used for producing the graft copolymer (B-II) according to the second invention, the suitable ratio between the amounts of the rubbery polymer (A-II) and the vinyl monomer (b-II) used, and the graft polymerization method. The radical polymerization initiator used in the graft polymerization and the type and amount of the emulsifier used are also the same as in the first invention.

The descriptions of the graft copolymer (B-I) according to the first invention directly apply to the method for recovering the graft copolymer (B-II) from the latex containing the graft copolymer (B-II) produced by emulsion polymerization and the coagulant used in this process.

The volume-average particle size of the graft copolymer (B-II) according to the second invention, which is produced using the rubbery polymer (A-II) according to the second invention by the above method, is normally less than 1000 nm. The average particle size of the graft copolymer (B-II) is measured by the method described in Examples below.

[Thermoplastic Resin Composition]

A method for producing the thermoplastic resin composition according to the second invention includes using the above-described graft copolymer (B-II) according to the second invention. Normally, the graft copolymer (B-II) according to the second invention is mixed with another thermoplastic resin. The descriptions of the thermoplastic composition according to the first invention directly apply to the suitable content of the graft copolymer (B-II) in the thermoplastic resin composition (hereinafter, may be referred to as "thermoplastic resin composition according to the second invention), the type of the other thermoplastic resin mixed with the graft copolymer (B-II), the suitable thermoplastic resin, the additive that may optionally be added to the thermoplastic composition, and a method for producing the thermoplastic resin composition.

[Molded Article]

A thermoplastic resin molded article having excellent impact resistance may be produced by molding the thermoplastic resin composition according to the second invention.

The thermoplastic resin composition according to the second invention is molded into an article by the same method as the thermoplastic resin composition according to the first invention. The preferable method for molding the thermoplastic resin composition into an article is also the same as in the first invention.

A molded article produced by molding the thermoplastic resin composition according to the second invention has excellent impact resistance and is suitably used as an automotive interior or exterior component, an OA instrument, a building material, or the like.

A molded article produced by molding the thermoplastic resin composition according to the second invention may be used in the following industrial applications: automotive components and, in particular, paintless interior and exterior components; building materials, such as a wall material and a window frame; tableware; toys; electric home appliances, such as a cleaner housing, a television housing, and an air-conditioner housing; interior materials; ship materials; and telecommunication equipment housings.

Embodiment of Third Invention

The graft copolymer (B-III) according to the third invention is produced by forming a graft layer (g) on a rubbery polymer (A-III). The rubbery polymer (A-III) includes an alkyl (meth)acrylate unit having 1 to 11 carbon atoms, an alkyl (meth)acrylate unit having 12 to 30 carbon atoms, a multifunctional monomer unit copolymerizable with the alkyl (meth)acrylates (hereinafter, this multifunctional monomer may be referred to simply as "multifunctional monomer"). The graft layer (g) is formed by grafting at least one vinyl monomer selected from the group consisting of an aromatic vinyl, an alkyl (meth)acrylate, and a vinyl cyanide to the rubbery polymer (A-III).

[Rubbery Polymer (A-III)]

The rubbery polymer (A-III) (hereinafter, may be referred to as "rubbery polymer (A-III) according to the third invention") constituting the graft copolymer (B-III) according to the third invention is described below.

The rubbery polymer (A-III) according to the third invention is produced by performing miniemulsion polymerization that includes a step in which a pre-emulsion is prepared preferably using a mixture containing an alkyl (meth)acrylate having 1 to 11 carbon atoms, an alkyl (meth)acrylate having 12 to 30 carbon atoms, a multifunctional monomer, and an emulsifier and more preferably using a mixture containing an alkyl (meth)acrylate having 1 to 11 carbon atoms, an alkyl (meth)acrylate having 12 to 30 carbon atoms, a multifunctional monomer, a radical polymerization initiator, an emulsifier, and water and a step in which the emulsion is polymerized.

The method for producing the rubbery polymer (A-III) according to the third invention by miniemulsion polymerization, in which a pre-emulsion is prepared using a mixture containing an alkyl (meth)acrylate having 1 to 11 carbon atoms, an alkyl (meth)acrylate having 12 to 30 carbon atoms, a multifunctional monomer, a radical polymerization initiator, an emulsifier, and water and the emulsion is polymerized, is described below.

The mechanisms of miniemulsion and miniemulsion polymerization are as described in the sections "Mechanisms of Miniemulsion" and "Miniemulsion Polymerization" in the first invention. The descriptions in the above sections directly apply to the third invention except that the terms "rubbery polymer (A-I)", "mixture (a-I)", and "graft copolymer (B-I)" are read as "rubbery polymer (A-III)", "mixture (a-III)", and "graft copolymer (B-III)", respectively.

Specifically, examples of the miniemulsion polymerization method used for producing the rubbery polymer (A-III) according to the third invention include, but are not limited to, a method including a step in which monomers including at least an alkyl (meth)acrylate having 1 to 11 carbon atoms, an alkyl (meth)acrylate having 12 to 30 carbon atoms, and a multifunctional monomer are mixed with an emulsifier, and, preferably, a radical polymerization initiator, a step in which the mixture (hereinafter, may be referred to as "mixture (a-III)") is formed into a pre-emulsion by the application of a shearing force, and a step in which the emulsion is heated to a polymerization initiation temperature to be polymerized.

The amount of the water solvent used in the preparation of the pre-emulsion is also the same as in the first invention described above.

<Alkyl (Meth)Acrylate Having 1 to 11 Carbon Atoms>

Examples of the alkyl (meth)acrylate having 1 to 11 carbon atoms which constitutes the rubbery polymer (A-III) according to the third invention include alkyl acrylates, such as methyl acrylate, ethyl acrylate, n-propyl acrylate, n-butyl acrylate, benzyl acrylate, and 2-ethylhexyl acrylate; and alkyl methacrylates, such as butyl methacrylate, hexyl methacrylate, and 2-ethylhexyl methacrylate. Among the above alkyl (meth)acrylates having 1 to 11 carbon atoms, n-butyl acrylate is preferable because it enhances the impact resistance of a molded article produced using the thermoplastic resin composition. The above alkyl (meth)acrylates having 1 to 11 carbon atoms may be used alone or in combination of two or more.

<Alkyl (Meth)acrylate Having 12 to 30 Carbon Atoms>

Using an alkyl (meth)acrylate having 12 to 30 carbon atoms, preferably having 15 to 27 carbon atoms, and more preferably having 18 to 24 carbon atoms in the formation of the pre-emulsion may further enhance stability. If the number of carbon atoms included in the alkyl (meth)acrylate is less than 12, variations in particle size may be increased due to Ostwald ripening and the amount of coarse particles may be increased as a result of coalescence of oil microdroplets. This leads to poor appearance of the molded article. If the number of carbon atoms included in the alkyl (meth)acrylate is more than 30, the viscosity of the solution is increased and, consequently, the amount of coarse oil droplets that are not torn is increased. This leads to poor appearance of the molded article.

Examples of the alkyl (meth)acrylate having 12 to 30 carbon atoms include decyl acrylate, undecyl acrylate, lauryl acrylate, tridecyl acrylate, myristyl acrylate, pentadecyl acrylate, cetyl acrylate, stearyl acrylate, isostearyl acrylate, oleyl acrylate, linoleyl acrylate, nonadecyl acrylate, docodecyl acrylate, behenyl acrylate, ceryl acrylate, decyl methacrylate, undodecyl methacrylate, lauryl methacrylate, tridecyl methacrylate, myristyl methacrylate, pentadecyl methacrylate, cetyl methacrylate, stearyl methacrylate, isostearyl methacrylate, oleyl methacrylate, linoleyl methacrylate, nonadecyl methacrylate, docodecyl methacrylate, behenyl methacrylate, and ceryl methacrylate. Among the above alkyl (meth)acrylates having 12 to 30 carbon atoms, decyl acrylate, lauryl acrylate, tridecyl acrylate, stearyl acrylate, docodecyl acrylate, ceryl acrylate, lauryl methacrylate, and stearyl methacrylate are preferable. The above alkyl (meth)acrylates having 12 to 30 carbon atoms may be used alone or in a mixture of two or more.

The amount of the alkyl (meth)acrylate having 12 to 30 carbon atoms used is preferably 0.1 to 50 parts by mass and is further preferably 1 to 10 parts by mass relative to 100 parts by mass of the total amount of the alkyl (meth)acrylate having 1 to 11 carbon atoms and the alkyl (meth)acrylate having 12 to 30 carbon atoms used. When the amount of the alkyl (meth)acrylate having 12 to 30 carbon atoms used falls within the above range, the amount of coagulum formed during polymerization is small, which leads to excellent production stability. Furthermore, excellent moldability of the thermoplastic resin composition and excellent impact resistance are achieved in a balanced manner.

<Multifunctional Monomer>

The descriptions of the function, specific examples, amount, and the like of the multifunctional monomer used for producing the rubbery polymer (A-I) according to the first invention directly apply to the multifunctional monomer used for producing the rubbery polymer (A-III) according to the third invention.

<Emulsifier>

The descriptions of the specific examples, amount, and the like of the emulsifier used for producing the rubbery polymer (A-I) according to the first invention directly apply to the emulsifier used for producing the rubbery polymer (A-III) according to the third invention.

<Radical Polymerization Initiator>

The descriptions of the specific examples, amount, and the like of the radical polymerization initiator used for producing the rubbery polymer (A-I) according to the first invention directly apply to the radical polymerization initiator used in the polymerization step subsequent to the pre-emulsion preparation step.

<Hydrophobic Substance>

A hydrophobic substance may be used for producing the rubbery polymer (A-III) according to the third invention in an amount at which the desired properties of the third invention are not impaired. Using a hydrophobic substance in the production of the pre-emulsion may further enhance the stability with which the miniemulsion polymerization is performed.

Examples of the hydrophobic substance include hydrocarbons having 10 or more carbon atoms; alcohols having 10 or more carbon atoms; hydrophobic polymers having a mass-average molecular weight (Mw) of less than 10000; hydrophobic monomers, such as a vinyl ester of an alcohol having 10 to 30 carbon atoms, a vinyl ether of an alcohol having 12 to 30 carbon atoms, a vinyl ester of a carboxylic acid having 10 to 30 carbon atoms (preferably 10 to 22 carbon atoms), and p-alkylstyrene; hydrophobic chain-transfer agents; and hydrophobic peroxides. The above hydrophobic substances may be used alone or in a mixture of two or more.

Specific examples of the hydrophobic substance include hexadecane, octadecane, icosane, liquid paraffin, liquid isoparaffin, a paraffin wax, a polyethylene wax, an olive oil, cetyl alcohol, stearyl alcohol, and polystyrene, poly (meth)acrylate, and polybutylene glycol that have a mass-average molecular weight (Mw) of 500 to 10000.

In the case where the hydrophobic substance is used, the amount of the hydrophobic substance used is preferably 0.1 to 10 parts by mass and is further preferably 1 to 3 parts by mass relative to 100 parts by mass of the alkyl (meth)acrylate. If the amount of the hydrophobic substance used is larger than the above upper limit, the amount of the gas generated during molding may be increased.

<Rubber Component>

In the production of the rubbery polymer (A-III) according to the third invention, a rubbery polymer (A-III) that is a rubber composite may be produced by using another rubber component in the preparation of the pre-emulsion such that the desired properties are not impaired. The descriptions of the rubber component used for producing the rubbery polymer (A-I) according to the first invention directly apply to the other rubber component.

<Reaction Conditions>

The miniemulsion formation step and the polymerization step subsequent to the miniemulsion formation step are conducted under the same reaction conditions as in the first invention.

<Particle Size>

The volume-average particle size of the rubbery polymer (A-III) according to the third invention which can be produced by the miniemulsion polymerization method described above is preferably 1000 nm or less, that is, for example, 100 to 600 nm, in consideration of polymerization stability.

The particle size of the rubbery polymer (A-III) according to the third invention preferably satisfies the following conditions (1) and (2) in order to enhance the impact resistance and appearance of the molded article. In conditions (1) and (2), X represents volume-average particle size (X), Y represents upper-frequency boundary 10%-volume particle size (Y) that is the particle size at which the cumulative frequency calculated from the upper boundary of a particle size distribution curve reaches 10%, and Z represents lower-frequency boundary 10%-volume particle size (Z) that is the particle size at which the cumulative frequency calculated from the lower boundary of the particle size distribution curve reaches 10%.

(1) Volume-average particle size (X) satisfies X≤300 nm, upper-frequency boundary 10%-volume particle size (Y) satisfies Y≤1.6 X, and lower-frequency boundary 10%-volume particle size (Z) satisfies Z≥0.5 X.

(2) Volume-average particle size (X) satisfies X=300 to 1000 nm, upper-frequency boundary 10%-volume particle size (Y) satisfies Y≤1.8 X, and lower-frequency boundary 10%-volume particle size (Z) satisfies Z≥0.4 X.

The volume-average particle size and particle size distribution of the rubbery polymer (A-III) are measured by the method described in Examples below.

[Graft Copolymer (B-III)]

The graft copolymer (B-III) according to the third invention is produced by forming a graft layer (g) on the rubbery polymer (A-III) according to the third invention prepared by the above method, the graft layer (g) being produced by grafting at least one vinyl monomer selected from an aromatic vinyl, an alkyl (meth)acrylate, and a vinyl cyanide to the rubbery polymer (A-III).

The graft layer (g) constituting the graft copolymer (B-III) according to the third invention is formed by chemically or physically bonding a part or the entirety of the vinyl monomer (b-III) to the rubbery polymer (A-III).

The graft ratio of the graft layer (g) of the graft copolymer (B-III) can be determined by the following method.

(Calculation of Graft Ratio)

To 2.5 g of the graft copolymer (B-III), 80 mL of acetone is added. The resulting mixture is placed in a hot-water bath at 65° C. to reflux for 3 hours in order to extract a constituent soluble in acetone. The remaining constituent insoluble in acetone is separated by centrifugation and dried. The mass of the dried acetone-insoluble constituent is measured. The mass proportion of the acetone-insoluble substance in the graft copolymer is calculated. The graft ratio is calculated using the following formula on the basis of the mass proportion of the acetone-insoluble substance in the graft copolymer.

Graft ratio (%)=(Mass proportion of acetone-insoluble substance−Mass proportion of rubbery polymer)/(Mass proportion of rubbery polymer)×100    [Math. 1]

The graft ratio of the graft copolymer (B-III) according to the third invention is preferably 10% to 90% and is particularly preferably 20% to 80%. When the graft ratio of the graft copolymer (B-III) falls within the above range, a molded article having good impact resistance and good appearance may be produced.

The graft layer (g) may further include a vinyl monomer other than an aromatic vinyl, an alkyl (meth)acrylate, or a vinyl cyanide.

The descriptions of the graft copolymer (B-I) according to the first invention directly apply to the suitable ratio between the amounts of the aromatic vinyl and the vinyl cyanide included in the vinyl monomer (b-III) used for producing the graft layer (g) of the graft copolymer (B-III) according to the third invention, the suitable ratio between the amounts of the rubbery polymer (A-III) and the vinyl monomer (b-III) used, and the graft polymerization method. The radical polymerization initiator used in the graft polymerization and the type and amount of the emulsifier used are also the same as in the first invention.

The descriptions of the graft copolymer (B-I) according to the first invention directly apply also to the method for recovering the graft copolymer (B-III) from the latex containing the graft copolymer (B-III) produced by emulsion polymerization and the coagulant used in this process.

The volume-average particle size of the graft copolymer (B-III) according to the third invention, which is produced using the rubbery polymer (A-III) according to the third invention by the above method, is normally less than 1000 nm. The average particle size of the graft copolymer (B-III) is measured by the method described in Examples below.

[Thermoplastic Resin Composition]

A method for producing the thermoplastic resin composition according to the third invention includes using the above-described graft copolymer (B-III) according to the third invention. Normally, the graft copolymer (B-III) according to the third invention is mixed with another thermoplastic resin. The descriptions of the thermoplastic composition according to the first invention directly apply to the suitable content of the graft copolymer (B-III) in 100 parts by mass of the thermoplastic resin composition (hereinafter, may be referred to as "thermoplastic resin composition according to the third invention), the type of the other thermoplastic resin mixed with the graft copolymer (B-III), the suitable thermoplastic resin, the additive that may optionally be added to the thermoplastic composition, and a method for producing the thermoplastic resin composition.

[Molded Article]

A thermoplastic resin molded article having excellent impact resistance may be produced by molding the thermoplastic resin composition according to the third invention.

The thermoplastic resin composition according to the third invention is molded into an article by the same method as the thermoplastic resin composition according to the first invention. The preferable method for molding the thermoplastic resin composition into an article is also the same as in the first invention.

A molded article according to the third invention produced by molding the thermoplastic resin composition according to the third invention has excellent impact resistance and excellent appearance and is suitably used as an automotive interior or exterior component, an OA instrument, a building material, or the like.

A molded article according to the third invention produced by molding the thermoplastic resin composition according to the third invention may be used in the following industrial applications: automotive components and, in particular, paintless interior and exterior components; building materials, such as a wall material and a window frame; tableware; toys; electric home appliances, such as a cleaner housing, a television housing, and an air-conditioner housing; interior materials; ship materials; and telecommunication equipment housings.

EXAMPLES

The present invention is described more specifically with reference to Synthesis examples, Examples, and Comparative examples below. The present invention is not limited by Examples below and various modifications can be made within the scope of the invention.

Hereinafter, the term "parts" refers to "parts by mass" and the symbol "%" refers to "% by mass".

Synthesis Examples, Examples, and Comparative Examples of First Invention

[Hydrophobic Substance]

The hydrophobic substances used were liquid paraffin "MORESCO WHITE", Model Nos. "P-40", "P-100", "P-120", "P-150", and "P-350P", produced by MORESCO Corporation; paraffin waxes "Paraffin Wax", Model Nos. "115", "125", and "135", produced by NIPPON SEIRO CO., LTD.; and hexadecane produced by Wako Pure Chemical Industries, Ltd. Tables 1A and 1B summarize the viscosities of the above hydrophobic substances.

[Measurement of Volume-Average Particle Size]

The average particle sizes of rubbery polymers (A-I-1) to (A-I-11) and volume-average particle sizes of graft copolymers (B-I-1) to (B-I-11) were determined by dynamic light scattering method using Nanotrac UPA-EX150 produced by NIKKISO Co., Ltd.

Production of Rubbery Polymer

Synthesis Example I-1: Production of Rubbery Polymer (A-I-1)

A rubbery polymer (A-I-1) was produced using the following materials.

[Materials]

| | |
|---|---|
| n-Butyl acrylate | 100 parts |
| MORESCO WHITE "P-60" | 2.4 parts |
| Dipotassium alkenyl succinate | 2.0 parts |
| Allyl methacrylate | 0.2 parts |
| 1,3-Butylene dimethacrylate | 0.5 parts |
| t-Butyl hydroperoxide | 0.25 parts |
| Ferrous sulfate | 0.0002 parts |
| Sodium formaldehyde sulfoxylate | 0.33 parts |
| Disodium ethylenediaminetetraacetate | 0.0004 parts |
| Distilled water | 406 parts |

Distilled water, n-butyl acrylate, MORESCO WHITE "P-60", dipotassium alkenyl succinate, allyl methacrylate, 1,3-butylene dimethacrylate, and t-butyl hydroperoxide were charged into a reactor equipped with a reagent injector, a condenser, a jacket heater, and a stirrer. The resulting mixture was subjected to an ultrasonic wave treatment using ULTRASONIC HOMOGENIZER US-600 produced by NIHONSEIKI KAISHA LTD. with an amplitude of 35 μm at room temperature for 20 minutes to form a pre-emulsion (a-I-1). The volume-average particle size of the resulting latex was 300 nm.

After the pre-emulsion (a-I-1) had been heated to 60° C., ferrous sulfate, sodium formaldehyde sulfoxylate, and disodium ethylenediaminetetraacetate were added to the pre-emulsion (a-I-1) in order to initiate radical polymerization. The liquid temperature was increased to 78° C. as a result of the polymerization of the acrylate component. The temperature was maintained to be 70° C. for 30 minutes in order to complete the polymerization of the acrylate component. Hereby, a latex containing a rubbery polymer (A-I-I) having a solid content of 18.7% and a volume-average particle size of 300 nm was prepared.

Synthesis Examples I-2 to I-10: Production of Rubbery Polymers (A-I-2) to (A-I-10)

Latexes each of which contained a specific one of rubbery polymers (A-I-2) to (A-I-10) having a solid content of 18.7% and a volume-average particle size of 300 nm were prepared as in Synthesis example I-1, except that the hydrophobic substances described in Tables 1A and 1B were used instead.

Synthesis Example I-11: Production of Rubbery Polymer (A-I-11)

A rubbery polymer (A-I-11) was produced using the following materials.

[Materials]

| | |
|---|---|
| n-Butyl acrylate | 100 parts |
| Allyl methacrylate | 0.2 parts |
| 1,3-Butylene dimethacrylate | 0.5 parts |
| t-Butyl hydroperoxide | 0.25 parts |
| Ferrous sulfate | 0.0002 parts |
| Sodium formaldehyde sulfoxylate | 0.33 parts |
| Disodium ethylenediaminetetraacetate | 0.0004 parts |
| Dipotassium alkenyl succinate | 2.0 parts |
| Distilled water | 406 parts |

Distilled water and dipotassium alkenyl succinate were charged into a reactor equipped with a reagent injector, a condenser, a jacket heater, and a stirrer. After the temperature had been increased to 60° C., ferrous sulfate, sodium formaldehyde sulfoxylate, and disodium ethylenediaminetetraacetate were added to the reactor. Then, a liquid mixture of n-butyl acrylate, allyl methacrylate, 1,3-butylene dimethacrylate, and t-butyl hydroperoxide was added dropwise to the reactor with a pump over 300 minutes. The temperature was increased to 80° C. After the addition of the liquid mixture had been completed, the temperature was maintained to be 70° C. for 30 minutes in order to complete the polymerization of the acrylate component. Hereby, a latex containing a rubbery polymer (A-I-11) was prepared. The latex containing the rubbery polymer (A-I-11) had a solid content of 18.4% and a volume-average particle size of 300 nm.

TABLE 1A

| Rubbery polymer | | A-I-1 | A-I-2 | A-I-3 | A-I-4 | A-I-5 | A-I-6 | A-I-7 | A-I-8 |
|---|---|---|---|---|---|---|---|---|---|
| Hydrophobic substance used | Type | Liquid paraffin | Liquid paraffin | Liquid paraffin | Liquid paraffin | Liquid paraffin | Paraffin Wax | Paraffin Wax | Paraffin Wax |
| | Model No. | P-60 | P-100 | P-120 | P-150 | P-350P | 135 | 125 | 115 |
| | Kinematic viscosity (mm²/s) 40° C. | 9.7 | 19 | 23.5 | 30.1 | 67.7 | — | — | — |
| | 100° C. | — | — | — | — | — | 3.9 | 3.3 | 3 |
| | Volume-average particle size(nm) | 300 | 300 | 300 | 300 | 300 | 300 | 300 | 300 |
| | Remarks | | | | | For first invention | | | |

TABLE 1B

| Rubbery polymer | | A-I-9 | A-I-10 | A-I-11 |
|---|---|---|---|---|
| Hydrophobic substance used | Type | Liquid paraffin | Hexadecane | Not used |
| | Model No. | P-40 | — | |
| | Kinematic viscosity (mm²/s) 40° C. | 4.3 | — | |
| | 100° C. | — | 1.2 | |
| Volume-average particle size(nm) | | 300 | 300 | |
| Remarks | | | For comparison | |

Production and Evaluations of Graft Copolymer

Example I-1: Production of Graft Copolymer (B-I-1)

Raw materials were charged into a reactor equipped with a reagent injector, a condenser, a jacket heater, and a stirrer in the amounts described below. After the inside of the reactor had been purged with nitrogen to a sufficient degree, the inside temperature of the reactor was increased to 70° C. while the inside of the reactor was stirred.

[Materials]

| | |
|---|---|
| Water (including water contained in the rubbery polymer latex) | 230 parts |
| Latex of the rubbery polymer (A-I-1) | 50 parts (as solid content) |
| Dipotassium alkenyl succinate | 0.2 parts |
| Sodium formaldehyde sulfoxylate | 0.3 parts |
| Ferrous sulfate | 0.001 parts |
| Disodium ethylenediaminetetraacetate | 0.003 parts |

Subsequently, a liquid mixture containing acrylonitrile (AN), styrene (ST), and t-butyl hydroperoxide in the amounts below was added dropwise to the reactor over 100 minutes, while the temperature was increased to 80° C.

[Materials]

| | |
|---|---|
| Acrylonitrile | 12.5 parts |
| Styrene | 37.5 parts |
| t-Butyl hydroperoxide | 0.2 parts |

After the addition of the liquid mixture had been completed, the temperature was maintained to be 80° C. for 30 minutes and subsequently reduced. Hereby, a latex containing a graft copolymer (B-I-1) was prepared. The latex of the graft copolymer (B-I-1) had a solid content of 29.7% and a volume-average particle size of 340 nm.

Then, 100 parts of a 1.5% aqueous sulfuric acid solution was heated to 80° C. While the aqueous solution was stirred, 100 parts of the latex containing the graft copolymer (B-I-1) was gradually added dropwise to the aqueous solution in order to solidify the graft copolymer (B-I-1). Subsequently, the temperature was further increased to 95° C. and maintained to be 95° C. for 10 minutes.

The resulting solid was dehydrated, cleaned, and dried. Hereby, a powdery graft copolymer (B-I-1) was prepared.

Examples I-2 to I-8 and Comparative Examples I-1 to I-3: Production of Graft Copolymers (B-I-2) to (B-I-11)

Graft copolymers (B-I-2) to (B-I-11) were prepared as in Example I-1, except that the latexes each of which contained a specific one of the rubbery polymers (A-I-2) to (A-I-11) were used instead of the latex of the rubbery polymer (A-I-1). Tables 2A and 2B summarize the volume-average particle sizes of the graft copolymers (B-I-2) to (B-I-11).

<Production of Thermoplastic Resin Composition>

With 40 parts of a specific one of the graft copolymers (B-I-1) to (B-I-11), 60 parts of an acrylonitrile-styrene copolymer ("UMG AXS Resin S102N" produced by UMG ABS, LTD.), which was produced by suspension polymerization, was mixed using a Henschel mixer. The resulting mixture was charged into an extruder heated at 240° C. and kneaded to form a pellet.

<Preparation of Test Piece>

The pellet formed in Production of Thermoplastic Resin Composition above was molded into a shape using a four-ounce injection molding machine (produced by The Japan Steel Works, LTD.) under the following conditions: cylinder temperature: 240° C., metal mold temperature: 60° C., injection rate: 20 g/sec. Hereby, a rod-like molded body 1 having a length of 80 mm, a width of 10 mm, and a thickness of 4 mm was prepared.

<Evaluations>

(Measurement of Charpy Impact Strength)

The Charpy impact strength of the molded body 1 was measured at 23° C. and −30° C. in accordance with ISO 179.

(Measurement of Melt Volume Rate (MVR))

The MVR of the pellet formed in Production of Thermoplastic Resin Composition above was measured under the conditions of 220° C.-98N in accordance with ISO 1133. The MVR of the pellet is a measure of the fluidity of the thermoplastic resin composition.

(Gas Generation and Deposition Test)

Injection molding of the pellet of the resin composition formed in Production of Thermoplastic Resin Composition above was performed using the metal mold 10 illustrated in FIG. 1, in which a molten resin ejected through a sprue 11 flows through runners 12 and 13 in two directions and subsequently ejected from side gates 14 and 15, and the portions of the molten resin meet each other in the mold to form a weld plane. In this process, a short shot was made such that a molten resin 20 did not form a weld plane and remained unfused at the center of the inside of the metal mold 10. Specifically, injection molding was performed in 100 shots such that a gas space was formed inside the metal mold 10. Subsequent to the injection molding, the amount of an oily deposit adhered to a portion 10a of the metal mold at which the unfused portion was exposed was measured as the amount of gas deposited. The gas generated during molding and deposited on the metal mold in the form of an oily deposit migrates onto the molded article side and degrades the appearance of the molded article. Therefore, the oily deposits adhered on the metal mold need to be removed by cleaning on a regular basis. This leads to poor continuous moldability. The smaller the amount of gas deposited, the higher the continuous moldability.

Tables 2A and 2B summarize the evaluation results.

TABLE 2A

| | | Example I-1 | Example I-2 | Example I-3 | Example I-4 | Example I-5 | Example I-6 | Example I-7 | Example I-8 |
|---|---|---|---|---|---|---|---|---|---|
| Graft copolymer | Type of graft copolymer | B-I-1 | B-I-2 | B-I-3 | B-I-4 | B-I-5 | B-I-6 | B-I-7 | B-I-8 |

TABLE 2A-continued

|  |  |  | Example I-1 | Example I-2 | Example I-3 | Example I-4 | Example I-5 | Example I-6 | Example I-7 | Example I-8 |
|---|---|---|---|---|---|---|---|---|---|---|
| Rubbery polymer |  | Rubbery polymer/AN/ST (part) | 50/12.5/ 37.5 | 50/12.5/ 37.5 | 50/12.5/ 37.5 | 50/12.5/ 37.5 | 50/12.5/ 37.5 | 50/12.5/ 37.5 | 50/12.5/ 37.5 | 50/12.5/ 37.5 |
|  |  | Volume-average particle size(nm) | 340 | 340 | 340 | 340 | 340 | 340 | 340 | 340 |
|  |  | Type | A-I-1 | A-I-2 | A-I-3 | A-I-4 | A-I-5 | A-I-6 | A-I-7 | A-I-8 |
|  | Hydrophobic substance used | Type | Liquid paraffin | Liquid paraffin | Liquid paraffin | Liquid paraffin | Liquid paraffin | Paraffin Wax | Paraffin Wax | Paraffin Wax |
|  |  | Model No. | P-60 | P-100 | P-120 | P-150 | P-350P | 135 | 125 | 115 |
|  |  | Kinematic viscosity (mm$^2$/s) 40° C. | 9.7 | 19 | 23.5 | 30.1 | 67.7 | — | — | — |
|  |  | 100° C. | — | — | — | — | — | 3.9 | 3.3 | 3 |
| Evaluation results | Charpy impact strength(kJ/m$^2$) | 23° C. | 11 | 12 | 12 | 13 | 13 | 13 | 13 | 12 |
|  |  | −30° C. | 2 | 2 | 2 | 3 | 3 | 2 | 2 | 2 |
|  | MVR (cm$^3$/10 min) |  | 22 | 21 | 21 | 20 | 20 | 19 | 19 | 20 |
|  | Amount of gas deposited(mg) |  | 0.3 | 0.3 | 0.2 | 0.1 | 0.1 | 0.1 | 0.1 | 0.1 |

TABLE 2B

|  |  |  | Comparative Example I-1 | Comparative Example I-2 | Comparative Example I-3 |
|---|---|---|---|---|---|
| Graft copolymer |  | Type of graft copolymer | B-I-9 | B-I-10 | B-I-11 |
|  |  | Rubbery polymer/AN/ST (part) | 50/12.5/ 37.5 | 50/12.5/ 37.5 | 50/12.5/ 37.5 |
|  |  | Volume-average particle size(nm) | 340 | 340 | 340 |
| Rubbery polymer |  | Type | A-I-9 | A-I-10 | A-I-11 |
|  | Hydrophobic substance used | Type | Liquid paraffin | Hexadecane | Not used |
|  |  | Model No. | P-40 | — | — |
|  |  | Kinematic viscosity (mm$^2$/s) 40° C. | 4.3 | — | — |
|  |  | 100° C. | — | 1.2 | — |
| Evaluation results | Charpy impact strength (kJ/m$^2$) | 23° C. | 9 | 9 | 6 |
|  |  | −30° C. | 1 | 1 | 1 |
|  | MVR (cm$^3$/10 min) |  | 22 | 22 | 19 |
|  | Amount of gas deposited(mg) |  | 0.5 | 0.5 | 0.1 |

The results obtained in Examples and Comparative examples confirm the following facts.

The thermoplastic resin compositions prepared in Examples I-1 to I-8 were excellent in terms of impact resistance, fluidity (moldability), and the amount of gas deposited (continuous moldability).

The thermoplastic resin compositions prepared in Comparative examples I-1 to I-3 were poor in terms of impact resistance, fluidity, or gas deposition. Specifically, in Comparative examples I-1 and I-2, where the kinematic viscosity of the hydrophobic substance used for producing the rubbery polymer were outside the range of the first invention, poor results were obtained in terms of gas deposition and impact resistance. In Comparative example I-3, where the hydrophobic substance was not used, impact resistance was significantly poor.

Synthesis Examples, Examples, and Comparative Examples of Second Invention

[Oil-Soluble Initiator]

The following oil-soluble initiators were used: peroxides produced by NOF CORPORATION, such as "PERHEXYL ND (t-hexyl peroxy neodecanoate)", "PEROYL 335-75(S) (di(3,3,5-trimethylhexanoyl) peroxide)", "PERBUTYL P (α,α'-bis(t-butylperoxy)diisopropylbenzene)", "PEROYL TCP (bis(4-t-butylcyclohexyl) peroxydicarbonate)", "PEROYL L (dilauroyl peroxide)", "PERTETRA A (2,2-bis(4,4-di-t-butylperoxycyclohexyl)propane)", "NYPER BW (benzoyl peroxide)", and "PERBUTYL H-69 (t-butyl hydroperoxide)"; and azo compounds produced by Wako Pure Chemical Industries, Ltd., such as "VE-073 (dimethyl 1,1'-azobis(1-cyclohexane carboxylate))" and "V-65 (2,2'-azobis(2,4-dimethyl valeronitrile))". Tables 3A and 3B summarize the numbers of carbon atoms included in the above oil-soluble initiators.

[Evaluation of Stability of Pre-Emulsion]

A pre-emulsion that was formed into a miniemulsion was charged into a graduated cylinder made of glass. The pre-emulsion was left to stand until the water phase and the oil phase were separated from each other. The stability of the pre-emulsion was evaluated in accordance with the following criterion. A pre-emulsion evaluated as "Δ", "○", or "⊙" was considered to be stable.

⊙: Separation did not occur even after the pre-emulsion had been left to stand for one week or more.

○: Separation occurred after the pre-emulsion had been left to stand for one day or more and less than one week.

Δ: Separation occurred after the pre-emulsion had been left to stand for 5 hours or more and less than 24 hours.

x: Separation occurred after the pre-emulsion had been left to stand for less than 5 hours.

[Measurement of Volume-Average Particle Size]

The average particle sizes of rubbery polymers (A-II-1) to (A-II-10) and the volume-average particle sizes of graft copolymers (B-II-1) to (B-II-10) were determined by dynamic light scattering method using Nanotrac UPA-EX150 produced by NIKKISO Co., Ltd.

[Measurement of Coagulum Content]

A latex containing a specific one of the rubbery polymers (A-II-1) to (A-II-10) and the graft copolymers (B-II-1) to (B-II-10) was filtered through a 100-mesh metal screen. Coagulum remaining on the 100-mesh metal screen was dried. The mass of the dried coagulum was measured. The ratio (mass %) of the mass of the coagulum to the mass of the specific one of the rubbery polymers (A-II-1) to (A-II-10) and the graft copolymers (B-II-1) to (B-II-10) was calculated. The smaller the content of coagulum, the higher the production stability of the latex of the rubbery polymer or graft copolymer.

[Measurement of Storage Stability]

A latex of a specific one of the graft copolymers (B-II-1) to (B-II-10) was filtered through a 100-mesh metal screen. The filtrate was left to stand at 25° C. for 10 days or 60 days. Subsequently, whether or not precipitates were present in the latex was determined. The storage stability of the latex was evaluated in accordance with the following criterion. A latex of a graft copolymer evaluated as "Δ", "○", or "⊙" was considered to be stable.

⊙: No precipitate was present even when the filtrate was left to stand for 60 days.

○: No precipitate was present even when the filtrate was left to stand for 10 days.

Δ: A trace amount of precipitate was present.

x: A large amount of precipitate was present.

Production of Rubbery Polymer

Synthesis Example II-1: Production of Rubbery Polymer (A-II-1)

A rubbery polymer (A-II-1) was produced using the following materials.
[Materials]

| | |
|---|---|
| n-Butyl acrylate | 100 parts |
| Dipotassium alkenyl succinate | 2.0 parts |
| Allyl methacrylate | 0.2 parts |
| 1,3-Butylene dimethacrylate | 0.5 parts |
| Hexadecane | 0.5 parts |
| PERHEXYL ND | 0.4 parts |
| Distilled water | 406 parts |

Distilled water, n-butyl acrylate, dipotassium alkenyl succinate, allyl methacrylate, 1,3-butylene dimethacrylate, hexadecane, and PERHEXYL ND were charged into an autoclave equipped with a reagent injector, a jacket heater, and a stirrer. The resulting mixture was subjected to an ultrasonic wave treatment using ULTRASONIC HOMOGENIZER US-600 produced by NIHONSEIKI KAISHA LTD. with an amplitude of 35 μm at room temperature for 20 minutes to form a pre-emulsion (a-II-1). The volume-average particle size of the resulting latex was 300 nm. The results of evaluation of the stability of the pre-emulsion (a-II-1) confirmed that the pre-emulsion (a-II-1) had good stability.

The pre-emulsion (a-II-1) was heated to 50° C. in order to initiate radical polymerization. The liquid temperature was increased to 68° C. as a result of the polymerization of the acrylate component. The temperature was maintained to be 70° C. for 30 minutes in order to complete the polymerization of the acrylate component. Hereby, a latex containing a rubbery polymer (A-II-1) having a solid content of 17.9%, a coagulum content of 0.90%, and a volume-average particle size of 320 nm was prepared.

Synthesis Examples II-2 to II-9: Production of Rubbery Polymers (A-II-2) to (A-II-9)

Latexes each of which contained a specific one of rubbery polymers (A-II-2) to (A-II-9) were prepared as in Synthesis example II-1, except that the oil-soluble initiators described in Tables 3A and 3B were used instead and the polymerization temperature was changed as described in Tables 3A and 3B. Tables 3A and 3B summarize the results of evaluation of the stability of the pre-emulsion and the solid content, coagulum content, and volume-average particle size of the rubbery polymer latex.

Synthesis Example II-10: Production of Rubbery Polymer (A-II-10)

A rubbery polymer (A-II-10) was produced using the following materials.
[Materials]

| | |
|---|---|
| n-Butyl acrylate | 100 parts |
| Allyl methacrylate | 0.2 parts |
| 1,3-Butylene dimethacrylate | 0.5 parts |
| PERBUTYL H-69 | 0.25 parts |
| Ferrous sulfate | 0.0002 parts |
| Sodium formaldehyde sulfoxylate | 0.33 parts |
| Disodium ethylenediaminetetraacetate | 0.0004 parts |
| Dipotassium alkenyl succinate | 2.0 parts |
| Distilled water | 406 parts |

Distilled water, dipotassium alkenyl succinate, 30 parts of n-butyl acrylate, 0.06 parts of allyl methacrylate, 0.15 parts of 1,3-butylene dimethacrylate, and 0.05 parts of PERBUTYL H-69 were charged into a nitrogen-purged reactor equipped with a reagent injector, a condenser, a jacket heater, and a stirrer. After the temperature had been increased to 60° C., ferrous sulfate, sodium formaldehyde sulfoxylate, and disodium ethylenediaminetetraacetate were added to the reactor. The resulting mixture was reacted for 60 minutes. Then, a liquid mixture of 70 parts of n-butyl acrylate, 0.14 parts of allyl methacrylate, 0.35 parts of 1,3-butylene dimethacrylate, and 0.2 parts of t-butyl hyperoxide was added dropwise to the reactor with a pump over 300 minutes. The temperature was increased to 80° C. After the addition of the liquid mixture had been completed, the temperature was maintained to be 70° C. for 30 minutes in order to complete the polymerization of the acrylate component. Hereby, a latex containing a rubbery polymer (A-II-10) was prepared. The amount of time required for producing the latex was 420 minutes. The latex containing the rubbery polymer (A-II-10) had a solid content of 18.0%, a coagulum content of 1.2%, and a volume-average particle size of 300 nm.

Production of Graft Copolymer

Example II-i-1: Production of Graft Copolymer (B-II-1)

Raw materials were charged into a reactor equipped with a reagent injector, a condenser, a jacket heater, and a stirrer in the amounts described below. After the inside of the reactor had been purged with nitrogen to a sufficient degree, the inside temperature of the reactor was increased to 70° C. while the inside of the reactor was stirred.

[Materials]

| | |
|---|---|
| Water (including water contained in the rubbery polymer latex) | 230 parts |
| Latex containing the rubbery polymer (A-II-1) | 50 parts (as solid content) |
| Dipotassium alkenyl succinate | 0.2 parts |
| Sodium formaldehyde sulfoxylate | 0.3 parts |
| Ferrous sulfate | 0.001 parts |
| Disodium ethylenediaminetetraacetate | 0.003 parts |

Subsequently, a liquid mixture containing acrylonitrile (AN), styrene (ST), and t-butyl hydroperoxide in the amounts below was added dropwise to the reactor over 100 minutes, while the temperature was increased to 80° C.

[Materials]

| | |
|---|---|
| Acrylonitrile | 12.5 parts |
| Styrene | 37.5 parts |
| PERBUTYL H-69 | 0.2 parts |

After the addition of the liquid mixture had been completed, the temperature was maintained to be 80° C. for 30 minutes and subsequently reduced. Hereby, a latex containing a graft copolymer (B-II-1) was prepared. The latex of the graft copolymer (B-II-1) had a solid content of 29.7%, a coagulum content of 0.02%, and a volume-average particle size of 370 nm. Tables 3A and 3B summarize the storage stability of the graft copolymer (B-II-1).

Then, 100 parts of a 1.5% aqueous sulfuric acid solution was heated to 80° C. While the aqueous solution was stirred, 100 parts of the latex containing the graft copolymer (B-II-1) was gradually added dropwise to the aqueous solution in order to solidify the graft copolymer (B-II-1). Subsequently, the temperature was further increased to 95° C. and maintained to be 95° C. for 10 minutes.

The resulting solid was dehydrated, cleaned, and dried. Hereby, a powdery graft copolymer (B-II-1) was prepared.

Examples II-i-2 to II-i-7 and Comparative Examples II-i-1 to II-i-3: Production of Graft Copolymers (B-II-2) to (B-II-10)

Graft copolymers (B-II-2) to (B-II-10) were prepared as in Example II-i-1, except that the latexes each of which contained a specific one of the rubbery polymers (A-II-2) to (A-II-10) were used instead of the latex of the rubbery polymer (A-II-1). Tables 3A and 3B summarize the volume-average particle sizes, storage stability, and coagulum content of each of the graft copolymers (B-II-2) to (B-II-10).

TABLE 3A

| | | Example II-i-1 | Example II-i-2 | Example II-i-3 | Example II-i-4 | Example II-i-5 | Example II-i-6 | Example II-i-7 |
|---|---|---|---|---|---|---|---|---|
| Rubbery polymer | | A-II-1 | A-II-2 | A-II-3 | A-II-4 | A-II-5 | A-II-6 | A-II-7 |
| Oil-soluble initiator | Type | Peroxide | Peroxide | Peroxide | Peroxide | Peroxide | Peroxide | Azo compound |
| | Product name | PERHEXYL ND | PEROYL 335-75(S) | PERBUTYL P | PEROYL TCP | PEROYL L | PERTETRA A | 74 VE-073 |
| | Number of carbon atoms | 16 | 18 | 20 | 22 | 24 | 31 | 16 |
| Stablity of pre-emulsion | | Δ | ○ | ○ | ◎ | ◎ | ◎ | Δ |
| Polymerization temperature (° C.) | | 50 | 65 | 125 | 45 | 65 | 100 | 78 |
| Volume-average particle size(nm) | | 320 | 320 | 310 | 300 | 300 | 300 | 330 |
| Solid content(%) | | 17.9 | 18.6 | 18.9 | 19 | 19.1 | 19.1 | 17.5 |
| Coagulum content(%) | | 0.90 | 0.30 | 0.10 | 0.02 | 0.01 | 0.01 | 0.9 |
| Graft copolymer | | B-1 | B-2 | B-3 | B-4 | B-5 | B-6 | B-7 |
| Volume-average particle size(nm) | | 370 | 370 | 340 | 340 | 340 | 340 | 380 |
| Storage stability | | Δ | Δ | ○ | ◎ | ◎ | ◎ | Δ |
| Coagulum content(%) | | 0.02 | 0.02 | 0.02 | 0.01 | 0.01 | 0.01 | 0.01 |

TABLE 3B

|  |  | Comparative example II-i-1 | Comparative example II-i-2 | Comparative example II-i-3 |
|---|---|---|---|---|
| Rubbery polymer |  | A-II-8 | A-II-9 | A-II-10 |
| Oil-soluble initiator | Type | Peroxide | Azo compound | Peroxide |
|  | Product name | NYPER BW | V-65 | PERBUTYL H-69 |
|  | Number of carbon atoms | 14 | 14 | 4 |
| Stability of pre-emulsion |  | x | x | — |
| Polymerization temperature (° C.) |  | 78 | 55 | 70 |
| Volume-average particle size(nm) |  | 340 | 350 | 300 |
| Solid content(%) |  | 14.2 | 17.2 | 18 |
| Coagulum content(%) |  | 5.0 | 2.0 | 1.2 |
| Graft copolymer |  | B-8 | B-9 | B-10 |
| Volume-average particle size(nm) |  | 400 | 400 | 340 |
| Storage stability |  | x | x | x |
| Coagulum content(%) |  | 0.10 | 0.09 | 0.03 |

Examples II-ii-1 to II-ii-7, Comparative Examples II-ii-1 to II-ii-3: Production of Thermoplastic Resin Composition With 40 parts of a specific one of the graft copolymers (B-II-1) to (B-II-10), 60 parts of an acrylonitrile-styrene copolymer ("UMG AXS Resin S102N" produced by UMG ABS, LTD.), which was produced by suspension polymerization, was mixed using a Henschel mixer. The resulting mixture was charged into an extruder heated at 240° C. and kneaded to form a pellet.

<Preparation of Test Piece>

The pellet formed in Production of Thermoplastic Resin Composition above was molded into a shape using a four-ounce injection molding machine (produced by The Japan Steel Works, LTD.) under the following conditions: cylinder temperature: 240° C., metal mold temperature: 60° C., injection rate: 20 g/sec. Hereby, a rod-like molded body having a length of 80 mm, a width of 10 mm, and a thickness of 4 mm was prepared.

<Evaluations>

(Measurement of Charpy Impact Strength)

The Charpy impact strength of the molded body was measured at 23° C. and −30° C. in accordance with ISO 179.

(Measurement of Melt Volume Rate (MVR))

The MVR of the pellet of the thermoplastic resin composition was measured under the conditions of 220° C.-98N in accordance with ISO 1133. The MVR of the pellet is a measure of the fluidity of the thermoplastic resin composition.

Tables 4A and 4B summarize the evaluation results.

TABLE 4A

|  |  |  | Example II-ii-1 | Example II-ii-2 | Example II-ii-3 | Example II-ii-4 | Example II-ii-5 | Example II-ii-6 | Example II-ii-7 |
|---|---|---|---|---|---|---|---|---|---|
| Graft co-polymer | Type of graft copolymer |  | B-II-1 | B-II-2 | B-II-3 | B-II-4 | B-II-5 | B-II-6 | B-II-7 |
|  | Rubbery polymer/AN/ST (part) |  | 50/12.5/37.5 | 50/12.5/37.5 | 50/12.5/37.5 | 50/12.5/37.5 | 50/12.5/37.5 | 50/12.5/37.5 | 50/12.5/37.5 |
|  | Volume-average particle size(nm) |  | 370 | 370 | 340 | 340 | 340 | 340 | 380 |
| Rubbery polymer | Type |  | A-II-1 | A-II-2 | A-II-3 | A-II-4 | A-II-5 | A-II-6 | A-II-7 |
|  | Polymerization method |  | Mini-emulsion polymerization | Mini-emulsion polymerization | Mini-emulsion polymerization | Mini-emulsion polymerization | Mini-emulsion polymerization | Mini-emulsion polymerization | Mini-emulsion polymerization |
|  | Oil-soluble initiator | Type | Peroxide | Peroxide | Peroxide | Peroxide | Peroxide | Peroxide | Azo compound |
|  |  | Product name | PER-HEXYL ND | PEROYL 335-75(S) | PER-BUTYL P | PEROYL TCP | PEROYL L | PER-TETRA A | VE-073 |
|  |  | Number of carbon atoms | 16 | 18 | 20 | 22 | 24 | 31 | 16 |
| Evaluation results | Charpy impact strength (kJ/m$^2$) | 23° C. | 12 | 12 | 15 | 15 | 15 | 15 | 12 |
|  |  | −30° C. | 3 | 3 | 4 | 4 | 4 | 4 | 3 |
|  | MVR (cm$^3$/10 min) |  | 31 | 31 | 30 | 30 | 30 | 30 | 31 |

TABLE 4B

|  |  | Comparative example II-ii-1 | Comparative example II-ii-2 | Comparative example II-ii-3 |
|---|---|---|---|---|
| Graft copolymer | Type of graft copolymer | B-II-8 | B-II-9 | B-II-10 |
|  | Rubbery polymer/AN/ST (part) | 50/12.5/37.5 | 50/12.5/37.5 | 50/12.5/37.5 |
|  | Volume-average particle size(nm) | 400 | 400 | 340 |

TABLE 4B-continued

|  |  |  | Comparative example II-ii-1 | Comparative example II-ii-2 | Comparative example II-ii-3 |
|---|---|---|---|---|---|
| Rubbery polymer | Type | | A-II-8 | A-II-9 | A-II-10 |
| | Polymerization method | | Miniemulsion polymerization | Miniemulsion polymerization | Emulsion polymerization |
| | Oil-soluble initiator | Type | Peroxide | Azo compound | Peroxide |
| | | Product name | NYPER BW | V-65 | PERBUTYL H-69 |
| | | Number of carbon atoms | 14 | 14 | 4 |
| Evaluation results | Charpy impact strength (kJ/m$^2$) | 23° C. | 9 | 9 | 7 |
| | | −30° C. | 3 | 3 | 1 |
| | MVR (cm$^3$/10 min) | | 32 | 32 | 22 |

The results obtained in Examples and Comparative examples confirm the following facts.

In Examples II-i-1 to II-i-7, the stability of the pre-emulsion was high. Furthermore, the latex of the graft copolymer (B-II) was excellent in terms of coagulum (production stability) and storage stability.

In Comparative examples II-i-1 to II-i-3, poor results were obtained in terms of the stability of pre-emulsion, coagulum content, or storage stability. Specifically, in Comparative examples II-i-1 and II-i-2, where the number of carbon atoms included in the oil-soluble initiator was outside the range of the second invention, the pre-emulsion had poor stability and a large amount of coagulum was formed in the polymerization step. In addition, storage stability was poor. In Comparative example II-i-3, where a polymerization method other than miniemulsion polymerization was used, inhomogeneous particles were formed. This resulted in poor storage stability.

The thermoplastic resin compositions prepared in Examples II-ii-1 to II-ii-7, which were prepared using the graft copolymers (B-II) prepared in Examples II-i-1 to II-i-7, had excellent impact resistance and excellent fluidity. In Comparative examples II-ii-1 and II-ii-2, where the graft copolymer used had poor production stability and poor storage stability, inhomogeneous particles were formed. This resulted in poor impact resistance. In Comparative example II-ii-3, where emulsion polymerization was used, a homogeneous polymer failed to be produced. This resulted in poor impact resistance and poor fluidity.

Production Examples, Examples, and Comparative Examples of Third Invention

[Measurement of Volume-Average Particle Size]

The volume-average particle sizes of rubbery polymers (A-III-1) to (A-III-10) and graft copolymers (B-III-1) to (B-III-10) were determined by dynamic light scattering method using Nanotrac UPA-EX150 produced by NIKKISO Co., Ltd.

The particle size distribution was determined by the same method as described above. The ratios of the upper-frequency boundary 10%-volume particle size (Y) and the lower-frequency boundary 10%-volume particle size (Z) relative to the volume-average particle size (X) were calculated.

[Measurement of Coagulum Content]

A latex containing a specific one of the rubbery polymers (A-III-1) to (A-III-10) and the graft copolymers (B-III-1) to (B-III-10) was filtered through a 100-mesh metal screen. Coagulum remaining on the 100-mesh metal screen was dried. The mass of the dried coagulum was measured. The ratio (mass %) of the mass of the coagulum to the mass of the specific one of the rubbery polymers (A-III-1) to (A-III-10) and the graft copolymers (B-III-1) to (B-III-10) was calculated. The smaller the coagulum content, the higher the production stability of the latex of the specific one of the rubbery polymers (A-III-1) to (A-III-10) and graft copolymers (B-III-1) to (B-III-10).

Production of (Meth)Acrylate

Production Example: Decyl Acrylate

Into a 3-Liter four-necked flask equipped with a stirrer, 3.330 parts of para-toluenesulfonic acid used as a catalyst, 100 parts of acrylic acid, 333 parts of decyl alcohol, 0.2 parts of methoquinone used as a polymerization inhibitor, and 366 parts of cyclohexane used as a dehydration solvent were charged. The resulting mixture was stirred in the stream of air. The mixture was then heated to 88° C. to reflux while stirred. The water produced in this process was removed. In this process, a sample was taken from the mixture and analyzed by gas chromatography. The reaction was terminated when the content of residual alcohol reached 1% or less.

After the reaction had been terminated, the reaction mixture was cleaned with 55 parts of water in order to remove unreacted acrylic acid and para-toluenesulfonic acid used as a catalyst. Subsequently, the reaction mixture was cleaned with a 5% aqueous sodium hydroxide solution in order to further remove unreacted acrylic acid.

In order to remove alkali included in the system, the reaction mixture that had been treated in the above manner was further cleaned with water. After it had been confirmed that the reaction mixture changed to substantially neutral, the reaction mixture was heated to 70° C. at a reduced pressure in order to remove cyclohexane. Hereby, decyl acrylate was prepared.

The (meth)acrylates described in Tables 5A and 5B were prepared as in the preparation of decyl acrylate above, except that the (meth)acrylic acid and alcohol used were changed, and desired (meth)acrylates were prepared.

Production of Rubbery Polymer

Example III-i-1: Production of Rubbery Polymer (A-III-1)

A rubbery polymer (A-III-1) was produced using the following materials.

[Materials]

| | |
|---|---|
| n-Butyl acrylate | 97.5 parts |
| Decyl acrylate | 2.5 parts |
| Dipotassium alkenyl succinate | 0.2 parts |
| Allyl methacrylate | 0.2 parts |
| 1,3-Butylene dimethacrylate | 0.5 parts |
| Dilauroyl peroxide | 0.4 parts |
| Distilled water | 406 parts |

Distilled water, n-butyl acrylate, decyl acrylate, dipotassium alkenyl succinate, allyl methacrylate, 1,3-butylene dimethacrylate, and dilauroyl peroxide were charged into a reactor equipped with a reagent injector, a condenser, a jacket heater, and a stirrer. The resulting mixture was subjected to an ultrasonic wave treatment using ULTRASONIC HOMOGENIZER US-600 produced by NIHONSEIKI KAISHA LTD. with an amplitude of 35 μm at room temperature for 20 minutes to form a pre-emulsion (a-III-1). The volume-average particle size of the resulting latex was 330 nm.

The pre-emulsion (a-III-1) was heated to 60° C. in order to initiate radical polymerization. The liquid temperature was increased to 78° C. as a result of the polymerization of the acrylate component. The temperature was maintained to be 75° C. for 30 minutes in order to complete the polymerization of the acrylate component. The amount of time required by the production was 90 minutes. Hereby, a latex containing a rubbery polymer (A-III-1) having a solid content of 18.3%, a coagulum content of 0.8%, and a volume-average particle size of 330 nm was prepared.

Examples III-i-2 to III-i-7 and Comparative Examples III-i-1 and III-i-2: Production of Rubbery Polymer (A-III-2) to (A-III-9)

Latexes each of which contained a specific one of the rubbery polymers (A-III-2) to (A-III-9) were prepared as in Example III-i-1, except that the alkyl (meth)acrylates described in Tables 5A and 5B were used instead.

Comparative Example III-i-3: Production of Rubbery Polymer (A-III-10)

A rubbery polymer (A-III-10) was produced using the following materials.
[Materials]

| | |
|---|---|
| n-Butyl acrylate | 100 parts |
| Allyl methacrylate | 0.2 parts |
| 1,3-Butylene dimethacrylate | 0.5 parts |
| t-Butyl hydroperoxide | 0.25 parts |
| Ferrous sulfate | 0.0002 parts |
| Sodium formaldehyde sulfoxylate | 0.33 parts |
| Disodium ethylenediaminetetraacetate | 0.0004 parts |
| Dipotassium alkenyl succinate | 0.2 parts |
| Distilled water | 406 parts |

Distilled water, 0.2 parts of dipotassium alkenyl succinate, 30 parts of n-butyl acrylate, 0.06 parts of allyl methacrylate, 0.15 parts of 1,3-butylene dimethacrylate, and 0.05 parts of t-butyl hydroperoxide were charged into a nitrogen-purged reactor equipped with a reagent injector, a condenser, a jacket heater, and a stirrer. After the temperature had been increased to 60° C., ferrous sulfate, sodium formaldehyde sulfoxylate, and disodium ethylenediaminetetraacetate were added to the reactor. The resulting mixture was reacted for 60 minutes. Then, a liquid mixture of 70 parts of n-butyl acrylate, 0.14 parts of allyl methacrylate, 0.35 parts of 1,3-butylene dimethacrylate, and 0.2 parts of t-butyl hydroperoxide was added dropwise to the reactor with a pump over 300 minutes. The temperature was increased to 80° C. After the addition of the liquid mixture had been completed, the temperature was maintained to be 70° C. for 30 minutes in order to complete the polymerization of the acrylate component. Hereby, a latex containing a rubbery polymer (A-III-10) was prepared. The amount of time required for producing the latex was 420 minutes. The latex containing the rubbery polymer (A-III-10) had a solid content of 18.0%, a coagulum content of 1.2%, and a volume-average particle size (X) of 300 nm.

Tables 5A and 5B summarize the production time, coagulum content, volume-average particle size (X), upper-frequency boundary 10%-volume particle size (Y), and lower-frequency boundary 10%-volume particle size (Z) of each of the rubbery polymers.

TABLE 5A

| | | | Example III-i-1 | Example III-i-2 | Example III-i-3 | Example III-i-4 | Example III-i-5 | Example III-i-6 | Example III-i-7 |
|---|---|---|---|---|---|---|---|---|---|
| | Rubbery polymer | | A-III-1 | A-III-2 | A-III-3 | A-III-4 | A-III-5 | A-III-6 | A-III-7 |
| Alkyl (meth) acrylate | Amount of n-butyl acrylate used (part) | | 97.5 | 97.5 | 97.5 | 97.5 | 97.5 | 97.5 | 97.5 |
| | Other (meth) acrylate | Type | Decyl acrylate | Tridecyl acrylate | Stearyl acrylate | Docosyl acrylate | Ceryl acrylate | Lauryl methacrylate | Stearyl methacrylate |
| | | Number of carbon atoms | 13 | 16 | 21 | 25 | 29 | 15 | 22 |
| | | Amount used (part) | 2.5 | 2.5 | 2.5 | 2.5 | 2.5 | 2.5 | 2.5 |
| Production time (min) | | | 90 | 90 | 90 | 90 | 90 | 90 | 90 |
| Coagulum content(%) | | | 0.8 | 0.4 | 0 | 0.2 | 0.8 | 0.4 | 0 |
| Volume-average particle size (X) (nm) | | | 330 | 310 | 300 | 300 | 330 | 310 | 300 |
| Upper-frequency boundary 10%-volume particle size (Y) (nm) | | | 580 | 530 | 420 | 430 | 580 | 540 | 430 |
| Lower-frequency boundary 10%-volume particle size (Z) (nm) | | | 150 | 160 | 180 | 170 | 140 | 160 | 190 |
| Remarks | | | | For Examples (acrylates) | | | | For Examples (methacrylates) | |

TABLE 5B

|  |  | Comparative example III-i-1 | Comparative example III-i-2 | Comparative example III-i-3 |
|---|---|---|---|---|
| Rubbery polymer |  | A-III-8 | A-III-9 | A-III-10 |
| Alkyl (meth) acrylate | Amount of n-butyl acrylate used (part) | 97.5 | 97.5 | 100 |
|  | Other (meth) acrylate Type | Octyl acrylate | Melissyl acrylate | — |
|  | Number of carbon atoms | 11 | 33 | — |
|  | Amount used (part) | 2.5 | 2.5 | 0 |
| Production time (min) |  | 90 | 90 | 420 |
| Coagulum content(%) |  | 3.1 | 2.3 | 1.2 |
| Volume-average particle size (X) (nm) |  | 360 | 340 | 300 |
| Upper-frequency boundary 10%-volume particle size (Y) (nm) |  | 690 | 630 | 510 |
| Lower-frequency boundary 10%-volume particle size (Z) (nm) |  | 120 | 140 | 90 |
| Remarks |  | For Comparative examples | | |

Production and Evaluations of Graft Copolymer

Example III-ii-1: Production of Graft Copolymer (B-III-1)

Raw materials were charged into a reactor equipped with a reagent injector, a condenser, a jacket heater, and a stirrer in the amounts described below. After the inside of the reactor had been purged with nitrogen to a sufficient degree, the inside temperature of the reactor was increased to 70° C. while the inside of the reactor was stirred.

[Materials]

| | |
|---|---|
| Water (including water contained in the rubbery polymer latex) | 230 parts |
| Latex of the rubbery polymer (A-III-1) | 50 parts (as solid content) |
| Dipotassium alkenyl succinate | 0.5 parts |
| Sodium formaldehyde sulfoxylate | 0.3 parts |
| Ferrous sulfate | 0.001 parts |
| Disodium ethylenediaminetetraacetate | 0.003 parts |

Subsequently, a liquid mixture containing acrylonitrile (AN), styrene (ST), and t-butyl hydroperoxide in the amounts below was added dropwise to the reactor over 100 minutes, while the temperature was increased to 80° C.

[Materials]

| | |
|---|---|
| Acrylonitrile | 12.5 parts |
| Styrene | 37.5 parts |
| t-Butyl hydroperoxide | 0.2 parts |

After the addition of the liquid mixture had been completed, the temperature was maintained to be 80° C. for 30 minutes and subsequently reduced. Hereby, a latex containing a graft copolymer (B-III-1) was prepared. The latex of the graft copolymer (B-III-1) had a solid content of 29.7%, a coagulum content of 0.1%, and a volume-average particle size of 370 nm.

Then, 100 parts of a 1.5% aqueous sulfuric acid solution was heated to 80° C. While the aqueous solution was stirred, 100 parts of the latex containing the graft copolymer (B-III-1) was gradually added dropwise to the aqueous solution in order to solidify the graft copolymer (B-III-1). Subsequently, the temperature was further increased to 95° C. and maintained to be 95° C. for 10 minutes.

The resulting solid was dehydrated, cleaned, and dried. Hereby, a powdery graft copolymer (B-III-1) was prepared.

Examples III-ii-2 to III-ii-7 and Comparative Examples III-ii-1 to III-ii-3: Production of Graft Copolymers (B-III-2) to (B-III-10)

Graft copolymers (B-III-2) to (B-III-10) were prepared as in Example III-ii-1, except that the latexes each of which contained a specific one of the rubbery polymers (A-III-2) to (A-III-10) were used instead of the latex of the rubbery polymer (A-III-1). Tables 6A and 6B summarize the volume-average particle sizes and coagulum content of each of the graft copolymers (B-III-2) to (B-III-10).

<Production of Thermoplastic Resin Composition>

With 40 parts of a specific one of the graft copolymers (B-III-1) to (B-III-10), 60 parts of an acrylonitrile-styrene copolymer ("UMG AXS Resin S102N" produced by UMG ABS, LTD.), which was produced by suspension polymerization, was mixed using a Henschel mixer. The resulting mixture was charged into an extruder heated at 240° C. and kneaded to form a pellet.

<Preparation of Test Piece>

The pellet of the thermoplastic resin composition was molded into a shape using a four-ounce injection molding machine (produced by The Japan Steel Works, LTD.) under the following conditions: cylinder temperature: 240° C., metal mold temperature: 60° C., injection rate: 20 g/sec. Hereby, a rod-like molded body 1 having a length of 80 mm, a width of 10 mm, and a thickness of 4 mm was prepared.

In the same manner as described above, the pellet of the thermoplastic resin composition was molded into a shape under the following conditions: cylinder temperature: 240° C., metal mold temperature: 60° C., injection rate: 20 g/sec. Hereby, tabular molded bodies 2 having a length of 100 mm, a width of 100 mm, and a thickness of 2 mm were prepared.

<Evaluations>

(Measurement of Charpy Impact Strength)

The Charpy impact strength of the molded body 1 was measured at 23° C. and −30° C. in accordance with ISO 179.

(Measurement of Melt Volume Rate (MVR))

The MVR of the pellet of the thermoplastic resin composition was measured under the conditions of 220° C.-98N in accordance with ISO 1133. The MVR of the pellet is a measure of the fluidity of the thermoplastic resin composition.

(Appearance)

Five molded bodies 2 were inspected with an optical microscope (magnification: 200 times), and the total number of coagulum particles having a size of 100 μm or more was counted. An evaluation was made in accordance with the following criterion. A molded body 2 evaluated as "○" or "⊙" was considered to have good appearance.

⊙: The number of coagulum particles having a size of 100 μm or more was 0 to 5.

○: The number of coagulum particles having a size of 100 μm or more was 6 to 20.

x: The number of coagulum particles having a size of 100 μm or more was 21 or more.

Tables 6A and 6B summarize the evaluation results.

TABLE 6A

|  |  | Example III-ii-1 | Example III-ii-2 | Example III-ii-3 | Example III-ii-4 | Example III-ii-5 | Example III-ii-6 | Example III-ii-7 |
|---|---|---|---|---|---|---|---|---|
| Graft copolymer | Type of graft copolymer | B-III-1 | B-III-2 | B-III-3 | B-III-4 | B-III-5 | B-III-6 | B-III-7 |
|  | Rubbery polymer/ AN/ST (part) | 50/12.5/ 37.5 | 50/12.5/ 37.5 | 50/12.5/ 37.5 | 50/12.5/ 37.5 | 50/12.5/ 37.5 | 50/12.5/ 37.5 | 50/12.5/ 37.5 |
|  | Volume-average particle size(nm) | 370 | 350 | 340 | 340 | 360 | 350 | 340 |
|  | Coagulum content(%) | 0.1 | 0.05 | 0.01 | 0.01 | 0.08 | 0.08 | 0.01 |
| Rubbery polymer | Type | A-III-1 | A-III-2 | A-III-3 | A-III-4 | A-III-5 | A-III-6 | A-III-7 |
| Alkyl (meth) acrylate | Amount of n-butyl acrylate used (part) | 97.5 | 97.5 | 97.5 | 97.5 | 97.5 | 97.5 | 97.5 |
|  | Other (meth) acrylate Type | Decyl acrylate | Tridecyl acrylate | Stearyl acrylate | Docosyl acrylate | Ceryl acrylate | Lauryl methacrylate | Stearyl methacrylate |
|  | Number of carbon atoms | 13 | 16 | 21 | 25 | 29 | 15 | 22 |
|  | Amount used (part) | 2.5 | 2.5 | 2.5 | 2.5 | 2.5 | 2.5 | 2.5 |
| Evaluation results | Charpy impact strength (kJ/m²) 23° C. | 10 | 11 | 15 | 12 | 10 | 10 | 15 |
|  | −30° C. | 3 | 3 | 5 | 3 | 3 | 3 | 5 |
|  | MVR (cm³/10 min) | 30 | 29 | 28 | 28 | 29 | 29 | 28 |
|  | Appearance | ○ | ○ | ◎ | ◎ | ○ | ○ | ◎ |

TABLE 6B

|  |  | Comparative example III-ii-1 | Comparative example III-ii-2 | Comparative example III-ii-3 |
|---|---|---|---|---|
| Graft copolymer | Type of graft copolymer | B-III-8 | B-III-9 | B-III-10 |
|  | Rubbery polymer/ AN/ST (part) | 50/12.5/ 37.5 | 50/12.5/ 37.5 | 50/12.5/ 37.5 |
|  | Volume-average particle size(nm) | 400 | 390 | 320 |
|  | Coagulum content(%) | 0.4 | 0.3 | 0.3 |
| Rubbery polymer | Type | A-III-8 | A-III-9 | A-III-10 |
| Alkyl (meth) acrylate | Amount of n-butyl acrylate used (part) | 97.5 | 97.5 | 100 |
|  | Other (meth) acrylate Type | Octyl acrylate | Melissyl acrylate | — |
|  | Number of carbon atoms | 11 | 33 | — |
|  | Amount used (part) | 2.5 | 2.5 | 0 |
| Evaluation results | Charpy impact strength (kJ/m²) 23° C. | 9 | 9 | 6 |
|  | −30° C. | 2 | 2 | 1 |
|  | MVR (cm³/10 min) | 30 | 30 | 18 |
|  | Appearance | x | x | x |

The results obtained in Examples and Comparative examples confirm the following facts.

Since the graft copolymers (B-III) prepared in Examples III-ii-1 to III-ii-7 had a small coagulum content, the thermoplastic resin compositions including the graft copolymers (B-III) were excellent in terms of impact resistance, fluidity, and appearance.

The thermoplastic resin compositions prepared in Comparative examples III-ii-1 to III-ii-3 were poor in terms of coagulum content after polymerization, impact resistance, fluidity, or appearance. Specifically, in Comparative examples III-ii-1 and III-ii-2, where the number of carbon atoms included in the alkyl (meth)acrylate was outside the range of the third invention, a sufficient miniemulsion was not formed and a large amount of coagulum resulting from coarse particles were formed after polymerization. This resulted in poor productivity. In addition, the molded article had poor appearance due to the coagulum remaining in the molded article. In Comparative example III-ii-3, where miniemulsion polymerization was not performed, a large amount of coagulum was formed after polymerization due to the coagulation of small particles. This resulted in poor productivity. Moreover, the small particles degraded moldability and impact resistance. In addition, the coagulum remaining in the molded article degraded the appearance of the molded article.

INDUSTRIAL APPLICABILITY

A molded article produced using the thermoplastic resin composition according to the first invention which includes the graft copolymer (B-I) according to the first invention has good impact resistance, good moldability, and good continuous moldability. Since the molded article achieves good impact resistance, good moldability, and good continuous moldability in a much more balanced manner than molded articles produced using known thermoplastic resin compositions, the thermoplastic resin composition according to the first invention and a molded article produced using the thermoplastic resin composition are highly valuable for use as various industrial materials.

According to the second invention, it is possible to produce a graft copolymer (B-II) having excellent storage stability with good production stability.

A molded article produced using a thermoplastic resin composition that includes the graft copolymer (B-II) according to the second invention has good impact resistance and good moldability. Since the molded article achieves good impact resistance and good moldability in a much more balanced manner than molded articles produced using known thermoplastic resin compositions, the thermoplastic resin composition according to the second invention and a molded article produced using the thermoplastic resin composition are highly valuable for use as various industrial materials.

A molded article produced using the thermoplastic resin composition according to the third invention which includes the graft copolymer (B-III) according to the third invention has good impact resistance and good appearance. Since the molded article achieves good impact resistance and good appearance in a much more balanced manner than molded articles produced using known thermoplastic resin compositions, the thermoplastic resin composition according to the third invention and a molded article produced using the thermoplastic resin composition are highly valuable for use as various industrial materials.

Although the present invention has been described in detail with reference to particular embodiments, it is apparent to a person skilled in the art that various modifications can be made therein without departing from the spirit and scope of the present invention.

The present application is based on Japanese Patent Application No. 2016-009798 filed on Jan. 21, 2016, and Japanese Patent Application Nos. 2016-062085 and 2016-062086 filed on Mar. 25, 2016, which are incorporated herein by reference in their entirety.

REFERENCE SIGNS LIST

10 METAL MOLD
11 SPRUE
12, 13 RUNNER
14, 15 SIDE GATE
20 MOLTEN RESIN

The invention claimed is:

1. A graft copolymer (B-I) produced by grafting at least one vinyl monomer (b-I) selected from the group consisting of aromatic vinyl, alkyl (meth)acrylate, and vinyl cyanide to a rubbery polymer mixture including a rubbery polymer (A-I) and a hydrophobic substance, the rubbery polymer (A-I) including an alkyl (meth)acrylate unit and a multifunctional monomer unit copolymerizable with alkyl (meth)acrylate, the hydrophobic substance having a kinematic viscosity of 5 $mm^2/s$ or more at 40° C. or a kinematic viscosity of 2 to 4 $mm^2/s$ at 100° C., the hydrophobic substance comprising a hydrocarbon.

2. The graft copolymer (B-I) according to claim 1, wherein an amount of the multifunctional monomer unit is 0.1 to 5.0 parts by mass relative to 100 parts by mass of a total amount of the alkyl (meth)acrylate unit and the multifunctional monomer unit.

3. The graft copolymer (B-I) according to claim 1, wherein a ratio between the rubbery polymer (A-I) and the vinyl monomer (b-I) is such that a proportion of the rubbery polymer (A-I) is 10% to 90% by mass and a proportion of the vinyl monomer (b-I) is 90% to 10% by mass (with the total proportion of the rubbery polymer (A-I) and the vinyl monomer (b-I) being 100% by mass).

4. The graft copolymer (B-I) according to claim 1, wherein the rubbery polymer mixture is a polymerization product produced by polymerizing a miniemulsion containing alkyl (meth)acrylate, the multifunctional monomer, the hydrophobic substance, an emulsifier, and water.

5. The graft copolymer (B-I) according to claim 4, wherein an amount of the hydrophobic substance is 0.1 to 10 parts by mass relative to 100 parts by mass of alkyl (meth)acrylate.

6. The graft copolymer (B-I) according to claim 4, wherein the rubbery polymer (A-I) included in the polymerization product has a volume-average particle size of less than 1000 nm.

7. A thermoplastic resin composition comprising the graft copolymer (B-I) according to claim 1.

8. A molded article produced using the thermoplastic resin composition according to claim 7.

9. A method for producing a rubbery polymer (A-I), the method comprising a miniemulsion formation step in which a mixture (a-I) containing alkyl (meth)acrylate, a multifunctional monomer copolymerizable with alkyl (meth)acrylate, a hydrophobic substance, an emulsifier, and water is formed into a miniemulsion, the hydrophobic substance having a kinematic viscosity of 5 $mm^2/s$ or more at 40° C. or a kinematic viscosity of 2 to 4 $mm^2/s$ at 100° C., the hydrophobic substance comprising a hydrocarbon, and a polymerization step in which the miniemulsion is polymerized.

10. A method for producing a graft copolymer (B-I), the method comprising grafting at least one vinyl monomer (b-I) selected from the group consisting of aromatic vinyl, alkyl (meth)acrylate, and vinyl cyanide to the rubbery polymer (A-I) produced by the method for producing the rubbery polymer (A-I) according to claim 9.

11. A method for producing a thermoplastic resin composition, the method comprising using the graft copolymer (B-I) produced by the method for producing the graft copolymer (B-I) according to claim 10.

12. A method for producing a molded article, the method comprising using the thermoplastic resin composition produced by the method for producing the thermoplastic resin composition according to claim 11.

13. The graft copolymer (B-I) according to claim 1, wherein the hydrophobic substance has a kinematic viscosity of 5 $mm^2/s$ or more and 67.7 $mm^2/s$ or less at 40° C. or a kinematic viscosity of 2 to 4 $mm^2/s$ at 100° C.

* * * * *